United States Patent [19]

Bhargava et al.

[11] Patent Number: 5,659,728
[45] Date of Patent: Aug. 19, 1997

[54] SYSTEM AND METHOD FOR GENERATING UNIQUENESS INFORMATION FOR OPTIMIZING AN SQL QUERY

[75] Inventors: Gautam Bhargava, Cupertino; Piyush Goel, Monte Sereno; Balakrishna R. Iyer, San Jose, all of Calif.

[73] Assignee: International Business Machines Corporation, Armonk, N.Y.

[21] Appl. No.: 366,560

[22] Filed: Dec. 30, 1994

[51] Int. Cl.$^6$ ........................................ G06F 17/30
[52] U.S. Cl. ........................................ 395/602
[58] Field of Search ........................................ 395/600, 602

[56] References Cited

U.S. PATENT DOCUMENTS

| 5,423,035 | 6/1995 | DePrez | 395/602 |
| 5,551,031 | 8/1996 | Cheng et al. | 395/602 |

OTHER PUBLICATIONS

Chen, A.L.P., "Outerjoin Optimization In Multidatabase Systems," *2nd International Symposium on Databases In Parallel And Distributed Systems*, pp. 211–218, 1990.

Galindo–Legaria, C., and Rosenthal, A., "How To Extend A Conventional Optimizer To Handle One–And Two–Sided Outerjoin," *Proceedings IEEE Data Engineering Conference*, pp. 402–409, 1992.

Paulley, G.N. and Larson, P–A., "Exploiting Uniqueness In Query Optimization," *CASCON*, pp. 804–822, vol. II, Oct. 1993.

Pirahesh, H., Hellerstein, J.M. and Hasan, W., "Extensible/Rule Based Query Rewrite Optimization In Starburst," *SIGMOD*, pp. 39–48, San Diego, CA, Jun. 1992.

Date, C.J., et al., "The Role Of Functional Dependence In Query Decomposition," *Relational Database Writings* 1989–1991, pp. 133–154.

Primary Examiner—Thomas G. Black
Assistant Examiner—Hosain T. Alam
Attorney, Agent, or Firm—Sterne, Kessler, Goldstein & Fox P.L.L.C.; Prentiss Wayne Johnson

[57] ABSTRACT

A system and method of determining uniqueness properties of an expression. A root of the expression is first determined, where the root is one of a base relation, a unary operation or a binary operation. Once the root is determined, a first procedure of an augmented unique process is called to determine uniqueness properties of a child of that root. The procedure called is chosen based on the determined root. Where the root is a base relation, a first procedure of a uniqueness process is applied to determine the uniqueness properties of the base relation. Where the root is a unary or binary operation, the called procedure is suspended, a second procedure of the augmented unique process is called to determine the uniqueness properties of the child of the operation, and this process is repeated until a base relation is reached. Once a base relation is reached, the first procedure of the uniqueness process is applied to determine the uniqueness properties of the reached base relation. A next procedure of a uniqueness process is applied to determine the uniqueness properties of a parent operator of the based relation. The procedure applied is chosen based on a type of operation represented by the parent. The process then unwinds to determine the uniqueness properties for each ancestor of the base relation(s).

14 Claims, 10 Drawing Sheets

SYSTEM AND METHOD FOR GENERATING UNIQUENESS INFORMATION FOR OPTIMIZING AN SQL QUERY

TECHNICAL FIELD

The present invention relates generally to query optimization, and more specifically to a system and method for generating uniqueness properties of intermediate query subexpressions.

BACKGROUND ART

Relational DataBase Management System (RDBMS) products using a Structured Query Language (SQL) interface are well known in the art. The SQL interface has evolved into a standard language for RDBMS products and has been adopted as such by both the American Nationals Standard Organization (ANSI) and the International Standards Organization (ISO). In RDBMS products, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to link information from multiple tables or views together to perform complex sets of procedures with a single statement.

The current state-of-the-art in query optimization provides few solutions for optimizing query expressions involving joins, outer joins and full outer joins. Some have suggested that queries could be optimized if certain uniqueness information is known about relations in a given expression. In particular, C. J. Date, and Hugh Darwen, in "Relational Database Writings 1989–1991," pp 133–153, indicate that uniqueness information can be used to optimize database queries.

However, there is little guidance regarding how to determine this much needed uniqueness information. Thus, if full advantage of certain optimization techniques is to be obtained, a technique for determining uniqueness information is needed.

DISCLOSURE OF INVENTION

The present invention is directed toward a system and method for determining uniqueness properties of an expression so that queries containing join and outer join operations can be optimized. According to the invention, two processes are implemented to determine the uniqueness properties of a given expression.

The first process, termed an augmented unique process, is a recursive process applied to the roots of the expression in question. The augmented unique process is used to call a second process, termed a uniqueness process. The uniqueness process is used to determine uniqueness properties of the elements of the expression in question. In operation, the augmented unique process begins at the root of the expression in question. The augmented unique process calls an appropriate procedure depending on the child, or children, of the root. Subsequent procedures of the augmented unique process are called in a recursive manner depending on the progeny of the root.

When a base relation is reached, the augmented unique process calls an appropriate procedure of the uniqueness process to determine the uniqueness properties of that base relation. The augmented unique process 'unwinds' by calling an appropriate procedure of the uniqueness process for each of the progenitors of the base relation. If the root of the expression in question is a binary operator, the processes described above are repeated for the other progeny of the binary operator.

A feature of the invention is that the uniqueness properties determined for the relations in the expression can be used for numerous applications. For example, in one application, the uniqueness properties are used to determine whether an intersect all operation can be replaced by an intersect distinct operation, thus simplifying the expression.

The uniqueness properties provide important information pertaining to the attributes of the expression. For each relation, base or otherwise, the uniqueness properties determined can include: the weakly bound set, the strongly bound set, the predictor set and the key set.

Further features and advantages of the present invention, as well as the structure and operation of various embodiments of the present invention, are described in detail below with reference to the accompanying drawings.

BRIEF DESCRIPTION OF DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

BEST MODE FOR CARRYING OUT THE INVENTION

The present invention is directed toward a system and method for optimizing SQL queries. According to the invention, uniqueness properties of each subexpression of an SQL query are determined using a recursive process called the augmented unique process. The augmented unique process recursively determines the uniqueness properties of each relation using a uniqueness process.

Further according to the invention, a concept of strong and weak bindings is used to propagate uniqueness information up an expression tree for a query. Then, for example, such information can be used to eliminate unnecessary duplicate removal operations, convert Intersect All to Intersect Distinct $\cap_a$ to $\cap_d$ which can then be converted to joins and/or used for "what-if" δ-pushdown to do subtree pruning. These transformations can provide orders of magnitude performance improvement in query execution times.

1. Environment of the Invention

Figure 1:
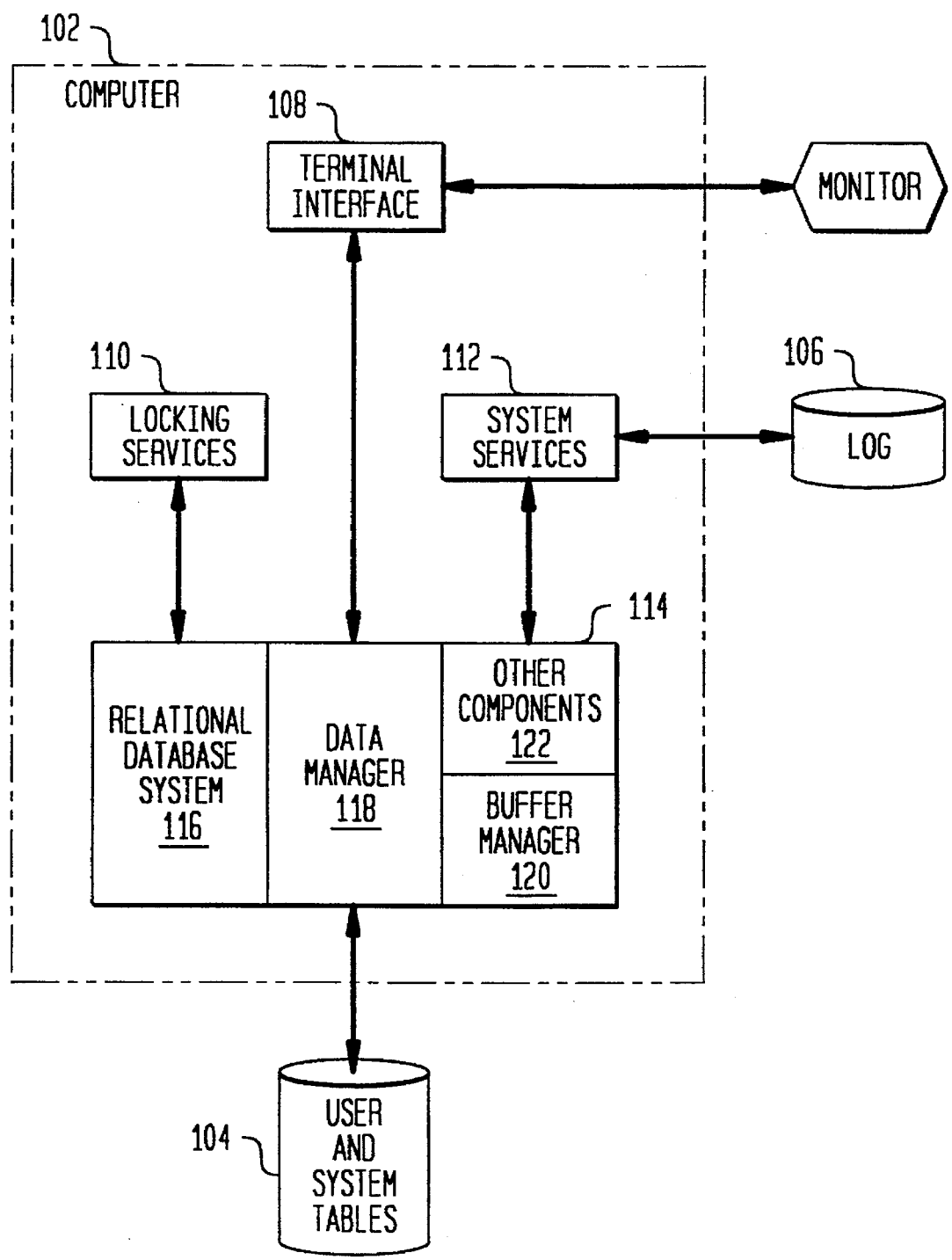
FIG. 1 is a diagram illustrating an exemplary computer hardware embodiment in which the present invention can be implemented.

FIG. 1 illustrates an exemplary computer hardware environment that in which the present invention can be implemented. In this exemplary environment, a computer system 102 is comprised of one or more processors connected to one or more electronic storage devices 104 and 106, such as disk drives, on which one or more databases are stored.

Operators of the computer system 102 use a standard terminal interface 108, such as IMS/DB/DC, CICS, TSO, or other interface, to perform various search and retrieval functions, termed queries, against the databases. These functions are typically performed using Relational DataBase Management System (RDBMS) software that incorporates the Structured Query Language (SQL) standard. In one embodiment of the present invention, the RDBMS software comprises the DB2 product offered by IBM for the MVS or OS/2 operating systems. As will become apparent to those skilled in the relevant art, the present invention has application to any RDBMS that uses SQL or any other data manipulation language.

The DB2 architecture includes three major components: (1) the IMS Resource Lock Manager (IRLM) 110, the Systems Services module 112, and the Database Services module 114. The IRLM 110 handles locking services for concurrency control. These locking services are provided because DB2 treats data as a shared resource, thereby allowing any number of users to access the same data simultaneously. Therefore, concurrency control is required to isolate users and to maintain data integrity.

The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These modules support the functions of the SQL language, i.e., definition, access control, retrieval, and update of user and system data.

Figure 2:
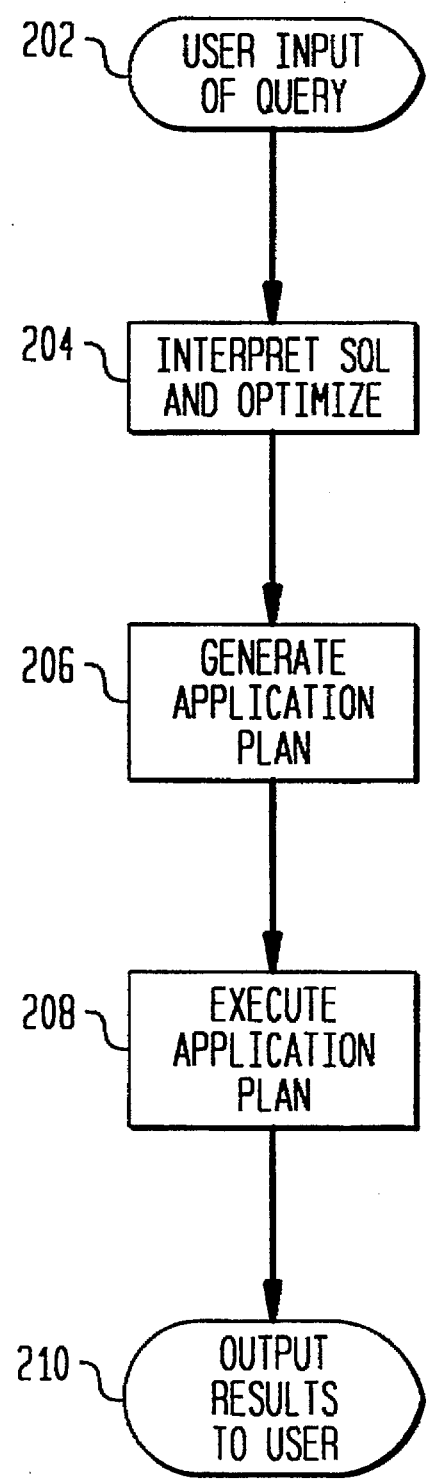
FIG. 2 is an operational flow diagram illustrating a method of interpreting and executing SQL statements.

FIG. 2 is a flowchart illustrating the steps necessary for the interpretation and execution of SQL statements in an interactive environment. Block 202 represents the input of SQL statements into the computer from the user. Block 204 represents the step of compiling or interpreting the SQL statements. An optimization function within block 204 may reorder the SQL query for optimum performance.

Block 206 represents the step of generating from the compiled SQL statements a compiled set of runtime structures, termed an application plan. Generally, the SQL statements received as input from the user specify only the data that the user wants, but do not specify how to get to that data. This step considers both the available access paths (indexes, sequential reads, etc.) and system-held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
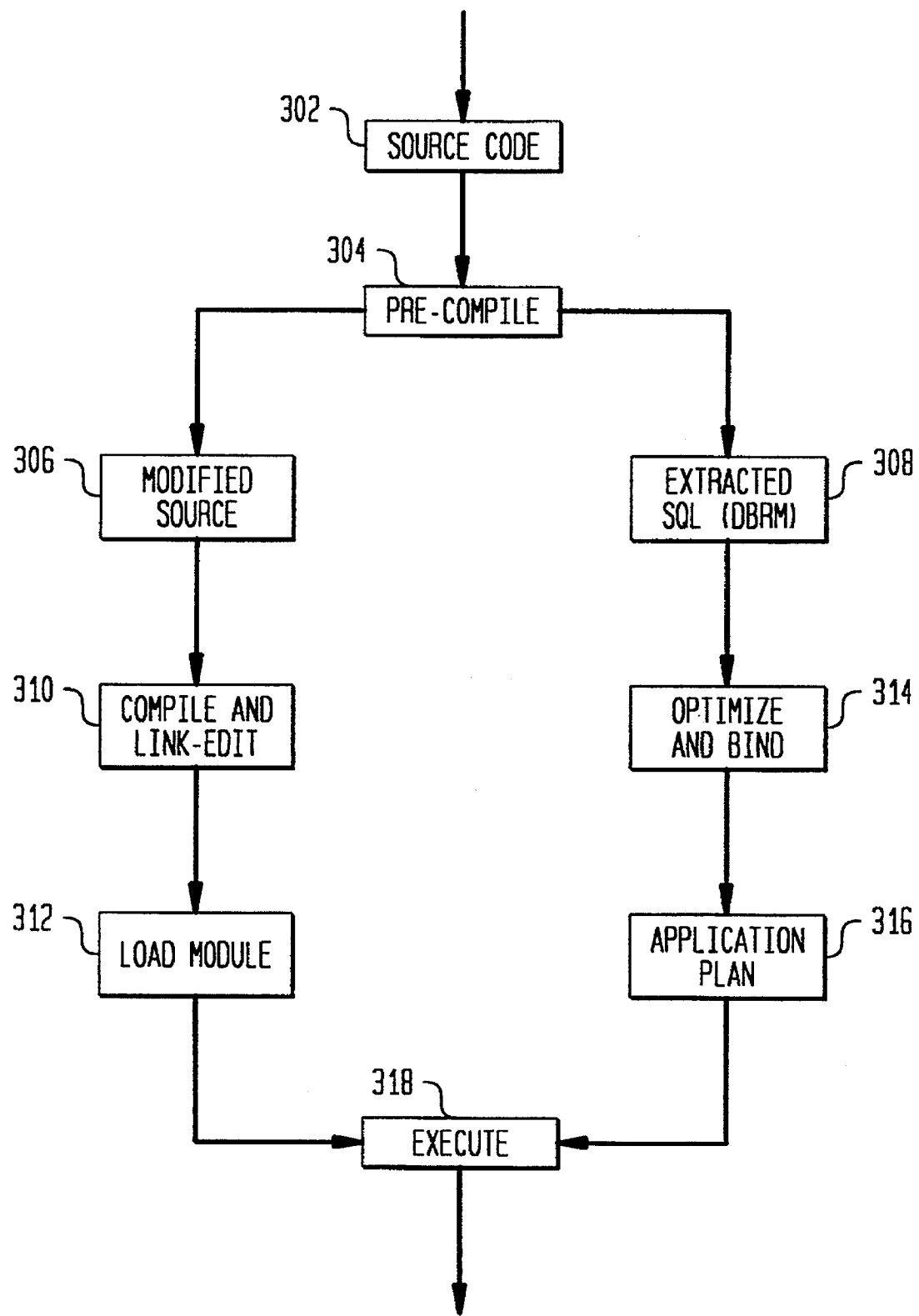
FIG. 3 is an operational flow diagram illustrating a method of interpreting and executing SQL statements embedded in source code.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a database request module (DBRM) 308. The modified source module 306 contains host language calls to DB2, which the pre-compile step 304 inserts in place of SQL statements. The DBRM 308 consists of the SQL statements from the program source code 302.

A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query so as to optimize the query. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

2.0 Conventional Optimization Techniques

In a given query expression, information about the uniqueness (or, "duplicate-free" status) of a sub(result) can be used to influence the optimal plan selection for the query. For example, the paper "Exploiting uniqueness in query optimization," by Paulley, G. N. and Larson, P-A., CASCON, pp. 804–822, Vol. II, October 1993, illustrates the case when an expensive, duplicate elimination clause such as SQL's SELECT DISTINCT can be converted to a much cheaper SELECT if it can be determined that the result is already duplicate free.

As another example the paper "Extensible/rule based query rewrite optimization in Starburst," by Pirahesh et al., SIGMOD, pp. 39–48, San Diego, Calif., June 1992, illustrates how special rules are allowed to fire in a rule-based optimizer when a "one-tuple condition" is determined.

Uniqueness propagation exploits available information about the uniqueness of tuples in base relations (enforced, e.g., through integrity constraints, key definitions, index uniqueness, etc.), along with properties of algebraic expressions that preserve and/or generate unique results, to influence the optimization of the query. For example, if it is known that one of the operands of an intersect all operation is an expression with unique tuples, then intersect all can be replaced by intersect distinct. See, for example, Paulley, G.

N. and Larson, P-A., "Exploiting uniqueness in query optimization," *CASCON*, pp. 804–822, Vol. II, October 1993.

3.0 Optimization Using Uniqueness Propagation

Uniqueness propagation as described by Paulley and Larsen can be exploited as follows for query optimization:

1. If one of the operands of the intersect all is known to have unique tuples, a SELECT DISTINCT . . . can be applied to this sub-expression, which may allow for the "pruning" away of some expensive outer joins from this sub-expression. See, for example, Chen, A. L. P., *"Outerjoin optimization in multidatabase systems," 2nd International Symposium on Databases in Parallel and Distributed Systems*, 1990
2. The newly transformed intersect distinct operator could be transformed into a join operator. See for example, Pirahesh et al., "Extensible/rule based query rewrite optimization in Starburst," *SIGMOD*, pp. 39–48, San Diego, Calif., June 1992.
3. The join operator could then be part of an extensive join, outer join, full outer join reorderability evaluation algorithm.

This invention defines the concept of weak bindings in the context of queries involving joins, outer joins, and intersection operations. This, together with new uniqueness determination identities, is used to present a technique unique for determining the unique set of a (sub)tree corresponding to a relational (sub-)expression.

3.1 Comparison With Conventional Techniques (Paulley, G. N. and Larson, P-A., "Exploiting uniqueness in query optimization," *CASCON*, pp. 804–822, Vol. II, October 1993) provides an algorithm to determine when the results of a join operation are duplicate free. That work is aimed at converting SQL's SELECT DISTINCT to SELECT for a class of queries that includes selections, projections, and joins, together with intersection operations. That work does not consider queries involving outer join, or full join operations, nor does it describe how uniqueness results can propagate across join, outer join, full outer join, and intersection operators.

4. Basic definitions

Before describing the invention in detail, some important definitions are set forth.

Tuple

A tuple t is a mapping from a finite set of attributes, $R \cup V$, to a set of atomic (possibly null) values where R is non-empty set of real attributes and V is a non-empty set of virtual attributes, $R \cap V = \{\}$, and the mapping t maps at least one virtual attribute $v \in V$ to a non-null value. For an attribute set X, t[X] represents the values associated with attributes X under the mapping t, where $X \subseteq R \odot V$ and $X \neq \{\}$.

The set of real attributes of a tuple t is the same as the schema of the tuple in the traditional relational algebras. These attributes are accessible to users and can be referenced externally, e.g., in user queries, etc. On the other hand, virtual attributes are (mostly) used to provide unique conceptual tuple-ids to tuples, and are not available for user queries. In some cases, when real attributes are not sufficient to identify tuples, virtual attributes have to be manipulated explicitly by the RDBMS.

Relation

A relation r is a triple (R, V, E) where R is a non-empty set of real attributes, V is a non-empty set of virtual attributes, and E, the extension of relation r, is a set of tuples such that $(\forall t_1 \in E)(\forall t_2 \in E)(t_1 \neq t_2 \rightarrow t_1[V] \neq t_2[V])$. $R \cup V$ is called the schema of relation r. We use sch(r) to denote the set of real attributes in the schema of r. Virtual and real attributes of relations are used to provide a conceptual framework for relations with duplicates.

Predicate

A predicate p over a set of real attributes sch(p), called the schema of p, is a total mapping from tuples to the Boolean values {TRUE, FALSE}, where sch(p) is the minimum set of attributes such that for all tuples $t_1$ and $t_2(t_1[sch(p)]=t_2[sch(p)] \rightarrow p(t_1)=p(t_2))$. For a tuple t with real schema $\supseteq sch(p)$, p(t) is TRUE if and only if $(\forall A \in sch(p))$ (substitution of t[A] for an A in p causes it to evaluate to TRUE).

Null-intolerant

A predicate p is null-intolerant if p evaluates to FALSE for tuples undefined on one or more attributes in sch(p). More formally, p is null-intolerant if $(\forall t)(\exists \in sch(p))$ (t[A]= NULL $\rightarrow$ p(t)=FALSE).

Throughout this document it is assumed that predicates are null-intolerant, and predicates do not contain disjunction.

5. Algebraic operators and expressions

Following are definitions for algebraic operators and notational conventions used in SQL queries. These definitions are helpful in understanding later portions of this document.

5.1 Algebraic operators

In the following, let $r=<R, V, E>$, $r_1=<R_1, V_1, E_1>$ and $r_2=<R_2, V_2, E_2>$ denote relations such that $R_1 \cap R_2=\{\}$ and $V_1 \cap V_2=\{\}$.

Projection

The projection, $\pi^a{}_X(r)$, of relation r onto attributes X is the relation $<X, V, E'>$ where $X \subseteq R$ and $E'=\{t.v|(\exists t' \in E)(t=t'[X] \wedge v=t'[V])\}$.

The $\pi^R$ operator is a projection operator that does not remove "duplicates" in the real attributes part of the source expression. The superscript a in $\pi^R$ denotes the fact that all the virtual attributes of the source expression are included in the virtual schema of the result expression. For ease of reading, the superscript a is omitted from $\pi^R$ when there is no ambiguity and the operator is simply written as $\pi$.

The projection$^c$, $\pi^c{}_{X_R X_V}(r)$, of relation r on attributes $X_R X_V$ is the relation $<X_R, X_V, E'>$, where $X_R \subseteq R$, $X_V \subseteq V$ and:

$$E'=\{t.v|(\exists t' \in E)(t=t'[X_R] pullout;zu972800\_002 v=t'[X_V])\}.$$

In contrast to $\pi$, $\pi^c$ allows a choice in the selection of the virtual attributes from the source expression. This operation is useful in defining the outer join operator defined below.

Delta Projection

The delta-projection, $\delta_{X_R X_V}(r)$, of r on attributes $X_R X_V$ is the relation $<X_R X_V, V_{new}, E'>$, where $X_R \subseteq R$, $X_V \subseteq V$, and:

$$E'=\{t|(\exists t' \in E) \ (t[X_R X_V]=t'[X_R X_V] \wedge t[V_{new}]=\text{a new, unique value})\}.$$

The $\delta$ operator models the SELECT DISTINCT . . . construct of SQL which allows elimination of "duplicates" from a relation. The $\delta$ operator is called the distinct projection operator and produces a result relation which has distinct values on the attributes $X_R X_V$ and a new virtual attribute.

Selection

The selection, $\sigma_p(r)$, of relation r on predicate p is the relation $<R, V, E'>$, where $sch(p) \subseteq R$, and:

$$E'=\{t|t \in E \wedge p(t)\}$$

Cross Product and Difference

The cross product, $r_1 \times r_2$, and difference, $r_1-r_2$, of relations $r_1$ and $r_2$ is the relation $<R_1 R_2, V_1 V_2, E_1 \times E_2>$ and $<R, V, E_1-E_2>$, respectively.

Join

The join, $r_1 \bowtie_p r_2$, or relations $r_1$ and $r_2$ is the relation $<R_1R_2, V_1V_2, E'>$, where:

$E' = \{t | t \in (E_1 \times E_2) \wedge p(t)\}$.

Equi-join predicate

The predicate p is called an equi-join predicate if it consists of conjuncts of clauses of the form $X_i = Y_j$, where $X_i$ and $Y_j$ are attributes of the relations referenced by the predicate.

Union Compatible

A relation $r_1 = <\{A_1, A_2, \ldots, A_n\}, V_1, E_1>$ is said to be union compatible with relation $r_2 = <\{B_1, B_2, \ldots, B_n\}, V_2, E_2>$ iff:

domain($A_i$)=domain ($B_i$), for $1 \leq i \leq n$.

That is, the real attributes of $r_1$ and $r_2$ can be ordered such that the domains of the first real attributes of $r_1$ and $r_2$ are the same, the domains of the second real attributes of $r_1$ and $r_2$ are the same, and so on.

Union and Outer Union

The union, $r_1 \cup r_2$, of union compatible relations $r_1$ and $r_2$ is the relation $(R, V, E_1 \cup E_2)$. The outer union, $r_1 \uplus r_2$, is the relation $(R_1 \cup R_2, V_1 \cup V_2, E')$, where:

$E' = \{t | (\exists t' \in E_1)(t[R_1V_1] = t' \wedge (\forall A \in (R_2 - R_1) \cup (V_2 - V_1))(t[A] = NULL))$
$\wedge (\exists t'' \in E_2)(t[R_2V_2] = t'' \wedge (\forall A \in (R_1 - R_2) \cup (V_1 - V_2))(t[A] = NULL))\}$.

Note that rows in $r_1 \uplus r_2$ are padded with NULLs for those attributes that are not present either in relation $r_1$ or in relation $r_2$.

The following notational convention is useful for the following definitions. If $r = <R, V, E>$ is a relation, the term ext(r) is used to represent E, the extension part of r. In order to maintain readability in the definitions, in the following few definitions we adopt the shorthand convention of simply writing $E_1 \bowtie E_2$ instead of ext($r_1 \bowtie r_2$), or $\pi_x(E_1 \bowtie E_2)$ instead of ext($\pi_x(r_1 \bowtie r_2)$), etc.

Left Outer Join

The left outer join, $r_1 \stackrel{p}{\bowtie} r_2$, is the relation $<R_1R_2, V_1V_2, E'>$, where $E' = (E_1 \bowtie^p E_2) \uplus (E_1 - \pi^e_{R_1V_1}(E_1 \bowtie^p E_2))$.

Preserved Relation and Null Supplying Relation

Relation $r_1$ in the above definition of left outer join, $r_1 \stackrel{p}{\bowtie} r_2$, is called the preserved relation and relation $r_2$ is called the null supplying relation. The right outer join, $r_1 \stackrel{p}{\bowtie} r_2$, can similarly be defined in which $r_1$ is the null supplying relation and $r_2$ is the preserved relation.

Full Outer Join

The full outer join, $r_1 \stackrel{p}{\bowtie} r_2$, of relations $r_1$ and $r_2$ is the relation $<R_1R_2, V_1V_2, E'>$, where $E' = (E_1 \bowtie^p E_2) \uplus (E_1 - \pi^e_{R_1V_1}(E_1 \bowtie^p E_2)) \uplus (E_2 - \pi^e_{R_2V_2}(E_1 \bowtie^p E_2))$.

Equivalent

Values $v_1$ and $v_2$ are said to be equivalent, denoted $v_1 \stackrel{\vartheta}{=} v_2$ if either both $v_1$, $v_2$ are non-NULL and $v_1 = v_2$, or if both are NULL.

Intersect Distinct

The intersect distinct, $r_1 \cap_d r_2$, of two union compatible relations $r_1$ and $r_2$ is the relation $<\{C_1, C_2, \ldots, C_n\}, V_{new}, E'>$, where domain($A_i$)=domain($B_i$)=domain($C_i$), $1 \leq i \leq n$, and $E' = \{t | (\exists t_1 \in E_2)(\forall i)(t[C_i] \stackrel{\vartheta}{=} t_1[A_i] \wedge t[C_i] \stackrel{\vartheta}{=} t_2[B_i] \wedge t[V_{new}] = \text{a new, unique value})\}$ Intersect distinct retains the common tuples in relations $r_1$ and $r_2$. If a tuple $t_1 \in E_1$ contains null value in attribute $A_i$ and $t_2 \in E_2$ contains null value in attribute $B_i$ and identical no-null values in the remaining attributes then $t_1$ and $t_2$ are considered equivalent and only a single copy is retained in the result. If either operand contains duplicates then only one copy of the common tuple is retained in the result.

Intersect All

By contrast, the operand intersect all, $\cap_a$, retains "some" of the duplicate copies of the common tuples. More precisely, in two union compatible relations $r_1$ and $r_2$, if a common tuple t appears i times in $r_1$ and j times in $r_2$, then t appears min$\{i,j\}$ times in the result relation $r_1 \cap_a r_2$.

5.2 Expressions and expression trees

The following provides a recursive definition of expressions.

1. If $r = <R, V, E>$ is a relation, then r is an expression. Henceforth, whenever there is no ambiguity, the shorthand notation e is used to represent the expression $e = <R, V, E>$, 2. If $e = <R, V, E>$ is an expression then $\pi^R_X(e)$ is an expression, where $X \subseteq R$.

3. If $e = <R, V, E>$ is an expression then $\delta_{X_R X_V}(e)$ is an expression, where $X_R \subseteq R$ and $X_V \subseteq V$.

4. If $e = <R, V, E>$ is an expression then $\sigma_p(e)$ is an expression, where sch(p) $\subseteq R$.

5. If $e_1 = <R_1, V_1, E_1>$ and $e_2 = <R_2, V_2, E_2>$ are expressions then $e_1 \theta e_2$ is an expression, where:

$\Theta \in \{\bowtie, \stackrel{p}{\bowtie}, \stackrel{p}{\bowtie}, \stackrel{p}{\bowtie}, \cap_d, \cap_a\}$, and p is a predicate such that sch(p) $\subseteq R_1R_2$, and sch(p) $\cap R_1 \neq \{\}$, and sch(p) $\cap R_2 \neq \{\}$.

6. If $e = <R, V, E>$ is an expression then so is (e), where $(e) = <R, V, E>$. This parenthesization is required due to the fact that some of the binary operations defined above are not fully associative. Parenthesization determines the evaluation order so that expressions can be evaluated un-ambiguously. However, whenever there is no ambiguity, parenthesis will be dropped freely.

Expression Tree

An expression can also be represented by a corresponding expression tree in which the inner nodes are the operators occurring in the expression and the leaves are the base relations referenced in the expression.

Let $\stackrel{p}{\circ}$ denote one of the binary operators defined in the previous section, then an expression tree T with left subtree $T_l$, right subtree $T_r$ and root $\stackrel{p}{\circ}$ is denoted by $(T_l \stackrel{p}{\circ} T_r)$.

Henceforth, the two equivalent representations are used interchangeably.

6. Uniqueness Properties

As stated above, the invention is directed toward a system and method for generating uniqueness information for relations in an expression. In one application, this information is used to optimize a query, such as an SQL query. To accomplish this objective, several innovations can be used as described below. These innovations include:

The concept of weak binding in the context of outer joins;

Powerful, yet simple, new identities for key set determination;

A process, termed 'uniqueness process' which provides a method for determining the unique set of a subtree corresponding to a relational sub-expression; and A process, termed 'augmented-unique process' for selecting roots of the expression to which the uniqueness process is applied. Roots are selected in the post order.

A unique set is the set of those attribute groups that uniquely identify tuples in the expression. For base relations, this is the same as the key set; for other expressions, the unique set may contain attributes which are not part of the expression's schema. In this latter case, the uniqueness test boils down to simply determining whether the schema of the expression contains a member of the unique set.

This point may be best illustrated by the following example: Consider the relation r=<R, V, E> having key K, and the expression $\pi_X(r)$. Then the unique set for both r and $\pi_X(r)$ contains the key K. However, tuples in $\pi_X(r)$ will be unique if $X \supseteq K$.

The uniqueness process, described in detail below, can be applied recursively in order to determine the unique set of every subtree in a given expression tree T. First, the unique sets of the base relations are determined. After the unique sets of the base relation have been determined, they are used to determine the unique sets of every subtree of expression tree T.

To determine the unique sets, the concept of a keySet(r) is used. First, KEY is used to denote a key of base relations r=<R, V, E>, where KEY⊆R and KEY is minimal in the sense that no subset of the attributes in KEY is a key for r. Then, keySet(r) is used to denote the set containing all minimal keys of r. Therefore, keySet(r) is called the unique set of relation r. Note, keySet(r) may be an empty set.

If $U(e_x)$ and $U(e_y)$ are two unique sets then $U(e_x) \circ U(e_y)$ denotes the following set:

$$U(e_x) \circ U(e_y) = \{K_1 \cup K_2 | K_1 \in U(e_x), K_2 \in U(e_y)\}$$

Intuitively, $U(e_x) \circ U(e_y)$ is the set of all possible keys that can be generated by combining the keys of $e_x$ and $e_y$.

Strong Binding

A concept called strong binding is also important in the invention. A real attribute A is said to be strongly bound if all tuples defined on schemas containing A have exactly the same non-null value for attribute A.

Typically, an attribute A in the real schema of expression e gets strongly bound when the select operation $\sigma_{p_x}(e)$ assigns a literal constant to attribute $A \in sch(p_x)$. For example $$\sigma_{A_1=5}(r) = \begin{array}{|c|c|} \hline A_1 & A_2 \\ \hline 5 & 6 \\ \hline 5 & 7 \\ \hline 5 & 8 \\ \hline \end{array}$$

selects all tuples of expression r where $A_1$ is equal to five. Because $A_1=5$ for all tuples in the selected set of tuples, $A_1$ is said to be strongly bound.

Further, if R is a set of attributes, the set:

$$sBind(p_x, R) = \{A | p_x \text{ strongly binds attribute } A \wedge A \in (sch(p_x) \cap R)\}$$

Weak Bindings

Equally important to the invention is a concept called weak binding. A real attribute A is said to be weakly bound if all tuples defined on schemas containing A have either a null value or exactly the same non-null value for attribute A.

Typically, a strongly bound attribute A in the real schema of expression $e_1$ gets weakly bound in the result of an expression such as $e_0 \rightarrow e_1$.

Predictor Sets

Yet another key concept of the invention is the identification of a predictor set. If A is a (strongly or weakly) bound attribute in the real schema of expression e, the predictor set of A, denoted pSet(A), is defined as follows:

1. $A \in pSet(A)$.
2. (Closure under predicate P:) If $X \in pSet(A)$ and subclause X=Y is part of an (inner/outer) join predicate P in e, then $Y \in pSet(A)$.

In the uniqueness process, information about bound attributes is used to get smaller keys from already available keys. More precisely, given that X is a key for expression e, and $A \in X$ is bound, the uniqueness process attempts to determine if X−A is also a key. This is trivially true if A is strongly bound and $X-A \neq \{\}$.

If, however, A is weakly bound, the following result occurs: If X is a key for e and $A \in X$ is weakly bound to constant c, then X−A is a key for e if:

$$\pi_{X-A}(\sigma_{A=c}(e)) \cap \pi_{X-A}(e - \sigma_{A=c}(e)) = \{\}, \text{ where } X-A \neq \{\}$$

In other words, if the same values for attributes X−A are not present in tuples having the value c for column A and tuples having NULL for column A, then A can be pruned from the key X.

The uniqueness process, described below, uses one manifestation of this sufficient condition using predictor sets (pSets) to determine the unique sets of the expression. The query expression is processed bottom-up, and pSets are built as bound attributes and equijoin predicates that reference these attributes are encountered.

As a later example shows, it is important to remember "levels" at which attributes are added to pSets. From a structural point-of-view, attribute B will be at a higher level than C in a query expression, if either B is from the preserved side and C is from the null-supplying side of an outer join on predicate B=C, or the query specifies application of predicate A=B after that of predicate A=C. Semantically, if B and C are attributes in pSet(A) and B has a higher level than C, then whenever values for C are non-null, so are the values for B. With this in mind, the definition of pSets is augmented to be a set of <attribute, level> pairs.

6.2 Identities for uniqueness propagation

Paulley, G. N. and Larson, P-A., in their paper "Exploiting uniqueness in query optimization," *CASCON*, pp. 804–822, Vol. II, October 1993, present the following result for join queries: If relations r and s both have primary keys, then key(r) ∘ key(s) is a key for r⋈s. However, that work does not consider key recognition across binary operators, →, ←, and ↔.

The following identity applies to binary operations of ⋈, →, ←, and ↔. For →, ←, and ↔ the identity is novel and unique. For ⋈ operations the identity is generally known, but is presented here for the sake of completeness.

If $e = L \, {}^{\theta}_{\oplus} R$ is an expression having L and R as its left and right operands, respectively, and ⊕ is a binary operator $\in \{\bowtie, \rightarrow, \leftarrow, \leftrightarrow\}$, then:

$$keySet(e) = S_1 \cup S_2 \cup S_3,$$

where $$S_1 = keySet(L) \circ keySet(R)$$

$$S_2 = \begin{cases} keySet(L) & \text{if } \Rightarrow \in \{\bowtie, \rightarrow\}, P_{LR} \text{ is equi-join} \\ & \text{and}(sch(P_{LR}) \cap sch(R)) \in \\ & keyset(R) \\ \{\ \} & \text{otherwise} \end{cases}$$

$$S_3 = \begin{cases} keySet(R) & \text{if } \Rightarrow \in \{\bowtie, \leftarrow\}, P_{LR} \text{ is equi-join} \\ & \text{and}(sch(P_{LR}) \cap sch(L)) \in \\ & keyset(L) \\ \{\ \} & \text{otherwise} \end{cases}$$

¹For ⋈ operator this is prior art.

To optimize the expression, the "minimal" key set is found from the set $S_1 \cup S_2 \cup S_3$, above. The uniqueness process, described in detail below, implements this expression to optimize queries.

6.3 Uniqueness Propagation

A process for doing uniqueness propagation up the expression tree for a given query expression is now described. However, before describing the process in detail, an understanding of the following additional notation is helpful.

sBindSet(T)

sBindSet(T)—denotes the set of strongly bound attributes in the (sub)expression represented by (sub)tree T.

wBindSet(T)

wBindSet(T)—denotes the set of weakly bound attributes in the (sub)expression represented by (sub)tree T.

joinAttr(T)

joinAttr(T)—denotes the set of attributes that are part of join predicates in the (sub)expression represented by (sub) tree T. For example, for the expression:

$$\sigma_{A_1=5}(A) \overset{A_1=B_1}{\rightarrow} \sigma_{B_1=5}(B)$$

the join attributes are $A_1 B_1$.

Shorthand Notation

If $\theta_r$ is the root of the (sub) tree corresponding to (sub)expression $e_x$, the shorthand notation sch($\theta_r$) is used to represent sch ($e_x$). For example, the root of the expression:

$$e = \delta_{A_1 B_1}(C \overset{C_1=A_1}{\rightarrow} (\sigma_{A_1=5}(A) \overset{A_1=B_1}{\rightarrow} \sigma_{B_1=5}(B)))$$

is $\delta_{A_1 B_1}$ and sch($\delta_{A_1 B_1}$) is used to represent sch(e). For the subexpression of e:

$$(C \overset{C_1=A_1}{\rightarrow} (\sigma_{A_1=5}(A) \overset{A_1=B_1}{\rightarrow} \sigma_{B_1=5}(B)), \overset{C_1=A_1}{\rightarrow}$$

is the root.

Minimum Column Set

If X is a set of attribute sets, then min(X) denotes the set $\{x | x \in X \wedge \forall y \in X (x \neq y \rightarrow x \leftrightarrow y)\}$. For example, if X={ABC, ABD, AB, BC,}, where ABC, ABD, AB and BC are all keys then:

min(X)={AB, BC} is the minimum set of columns that imply that the others are also keys.

If <B, 1> ∈ pSet(A) then the notation level(B) represents 1, the level of attribute B.

Recall that the attributes in the result of r∩s are the renamed versions of attributes of its union-compatible operands. If Y⊆sch(r)∪sch(s), rename∩(Y) represents the renamed version of the attributes in Y corresponding to the attribute names in the result of ∩.

The input to the uniqueness process is the root of an expression (sub)tree T containing unary operators such as δ, π, σ and binary operators such as ⋈, →, ←, ↔, ∩_d, ∩_a. Any or all of these operators can be in the expression in any sequence (provided, of course, that the expression is meaningful).

All the join predicates in the expression are equi-join predicates.

The uniqueness process is applied to the subject expression from the bottom-up to determine the following properties, referred to as the "uniqueness properties."

1. the unique set, unique(T), for the input (sub)expression, represented by (sub)tree T. This is the unique set of columns that identify the output of T.
2. the strongly bound set, sBindSet(T) for the input (sub) expression, represented by (sub)tree T. These are the strongly bound attributes of T, for which, by definition tuples can only have the same constant value.
3. the weakly bound set wBindSet(T) for the input (sub) expression, represented by (sub)tree T. These are the weakly bound attributes of T, for which, by definition tuples have the same constant value or null.
4. the predictor set is pSet(A) for each bound attribute A.

The uniqueness process is applied recursively beginning at the root of the subject expression as described by the following augmented-unique process. The augmented-unique process traverses the subject expression in the post order. The augmented-unique process is set forth in detail as follows:

Input: Root of an expression (sub)tree T containing unary operators (δ, π, σ) and binary operators {⋈, →, Y, ↔, ∩_d, ∩_a}. All the join predicates in the expression are equi-join predicates.

Output:
1. unique(T), the unique set for the input (sub) expression, represented by (sub)tree T.
2. sBindSet (T).
3. wBindSet (T).
4. For each bound attribute A, its predictor set pSet(A).

Procedure: Let $\theta_r$ be the root of T.

1. If $\theta_r$ is a leaf (i.e., a base relation s) then perform step 1 in the uniqueness process.
2. If T=σ_p(T') then
   call augmented_unique(T') to obtain unique(T'), sBindSet(T'), wBindSet(T') and pSet.
   Perform step 2 in unique to determine unique(T), sBindSet(T), wBindSet(T) and pSet.
3. If T=δ_X(T') then
   call augmented_unique(T') to obtain unique(T'), sBindSet(T'), wBindSet(T') and pSet.
   Perform step 3 in uniqueness process to determine unique(T), sBindSet(T), wBindSet (T) and pSet.
4. If T=π_x(T') then
   call augmented_unique (T') to obtain unique(T'), sBindSet(T'), wBindSet(T') and pSet.
   Perform step 4 in uniqueness process to determine unique(T), sBindSet(T), wBindSet(T) and pSet.
5. If T=T_L θ T_R then
   call augmented_unique(T_L) to obtain unique(T_L), sBindSet(T_L), wBindSet(T_L) and pSet.
   call augmented_unique(T_R) to obtain unique(T_R), sBindSet(T_L), wBindSet(T_R) and pSet.

Perform step 5 in uniqueness process to determine unique(T), sBindSet(T), wBindSet(T) and pSet.

6. If T=T$_L$∩T$_R$, where ∩∈{∩$_a$, ∩$_d$}, then call augmented_unique(T$_L$) to obtain unique(T$_L$), sBindSet(T$_L$), wBindSet(T$_L$) and pSet.

call augmented_unique(T$_R$) to obtain unique(T$_R$), sBindSet(T$_R$), wBindSet(T$_R$) and pSet.

Perform step 6 in unique to determine unique(T), sBindSet(T), wBindSet(T) and pSet.

Figure 4:
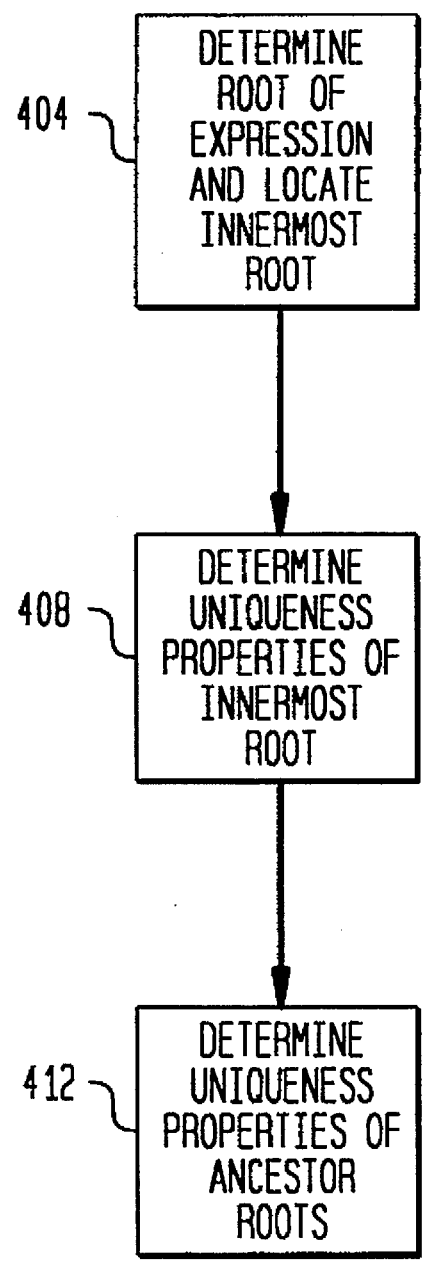
FIG. 4 is an operational flow diagram illustrating an application of an augmented unique process according to one embodiment of the invention.

FIG. 4 is a high-level flow diagram illustrating the augmented unique process. In a step 404, the process begins at the root of the expression and continues to find the innermost root contained in the expression. Once the innermost root is found, in a step 408, the uniqueness properties of that root are determined. In a step 412 the process 'unwinds' to determine the uniqueness properties of subsequent roots of the expression from the inside out.

Figure 5:
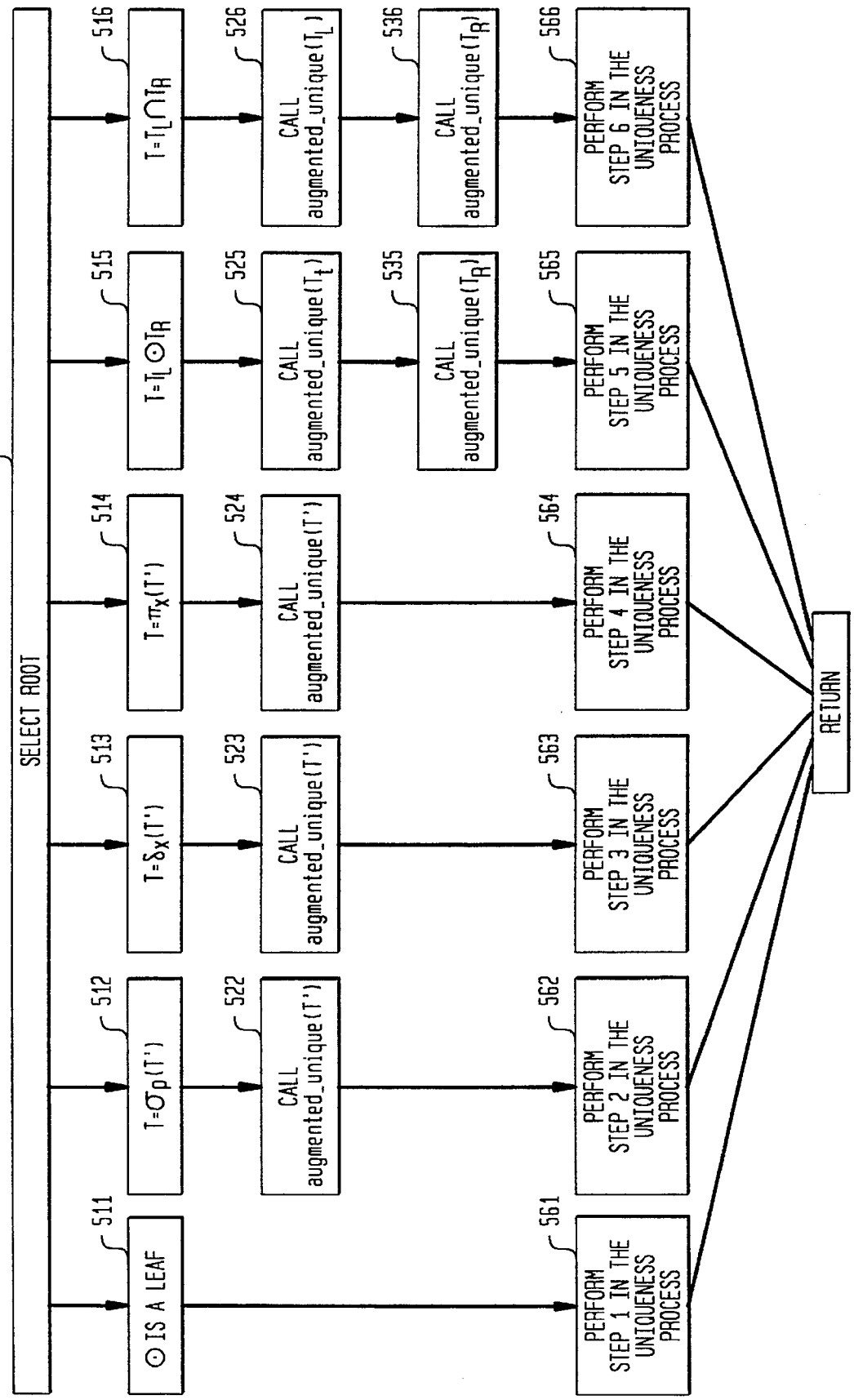
FIG. 5 is an operational flow diagram illustrating steps associated with the augmented unique process according to one embodiment of the invention.

FIG. 5 is an operational flow diagram illustrating the augmented unique process in greater detail. In a step 504, the root of the expression T is determined. The root of the expression T is examined first as illustrated by steps 511 through 516. The actual step followed depends on the type of root. Once it is determined what the root of the expression is, an appropriate call is made to determine the uniqueness properties of the child, T', of the root of expression T as illustrated by steps 561 and 522 through 526. Where the root is a leaf as illustrated by step 511, procedure 1 of the uniqueness process is performed to determine the uniqueness properties of that leaf, as illustrated in a step 561. The uniqueness process is described in detail below.

If, instead, the root of the expression is a unary operation, as illustrated by steps 512, 513 and 514, the operation continues at one of steps 522, 523, and 524 where the uniqueness properties of the child, T', of that unary operation are determined. This is done in a recursive manner by suspending the original procedure and re-entering the augmented unique process at step 504, as illustrated by step 570. This process continues recursively until the base relation of the sub-expression is reached (i.e., where T' is a leaf) and in step 561, procedure 1 of the uniqueness process is used to determine the uniqueness properties of that leaf.

The process then 'unwinds' to determine the uniqueness properties of the parent operator of that leaf (i.e., the operation returns to the suspended call). Now, the operation continues at steps 562, 563, or 564 depending on the type of operator in question.

If the root of the expression is a binary operation as illustrated by steps 515 and 516, the uniqueness properties of one side of the binary operation are determined as illustrated by steps 525 and 526, respectively, and then the uniqueness properties of the second side of the binary operation are determined as illustrated by steps 535 and 536, respectively. As is the case with the unary operations above, the properties of all descendants of the binary operation must be determined first. Thus, the augmented-unique process is applied recursively.

Once the uniqueness properties of both sides of the binary operation are determined, the uniqueness process is applied to the root to determine its uniqueness properties in steps 565 and 566.

To provide further clarity, this procedure is now described in terms of a simple example. Consider the expression:

$$\pi_{C_1}(\delta_{B_1C_1}(C \stackrel{C_1=A_1}{\rightarrow} (A \stackrel{A_1=B_1}{\rightarrow} (\sigma_{B_1=4}(B)))) \cap_a \pi_{D_1}(D \stackrel{D_1=E_1}{\rightarrow} E).$$

To optimize this expression, it is desirable to replace the intersect all operator ∩$_a$ with an intersect distinct operator ∩$_d$ if possible. To determine whether such optimization is possible, the uniqueness process is followed to apply uniqueness process to each root of the expression to determine the unique sets of the expression.

As stated above, the starting point of the optimization process is at the root of the expression. In the example expression, the root is the intersect all operator. Therefore, the procedure applied of the augmentation-unique process is procedure 6, illustrated by step 516 of FIG. 5. In a step 526, augmented-unique(T$_L$) is called to determine the uniqueness properties of the left child. Note that either the left or the right child could be evaluated first, but that this example chooses to evaluate the left side first.

The left child of the intersect all root is $\pi_{C_1}$. Thus, the call in step 526 is suspended and the operation continues at step 514, where the uniqueness properties of the root $\pi_{C_1}$ are determined. To determine the uniqueness properties of the root $\pi_{C_1}$, the uniqueness properties of the child of the root $\pi_{C_1}$ are determined in step 524. The child, T$^1$, of $\pi_{C_1}$(T$^1$) is:

$$\delta_{B_1C_1}(C \stackrel{C_1=A_1}{\rightarrow} (A \stackrel{A_1=B_1}{\rightarrow} (\sigma_{B_1=4}(B)))).$$

The root of this child is $\delta_{B_1C_1}$. Thus, the call in step 524 is suspended and the operation continues at step 513, where the uniqueness properties of $\delta_{B_1C_1}(T^1)$ are determined. To determine the uniqueness properties of $\delta_{B_1C_1}(T^1)$, the uniqueness properties of the children T$^1$ must be determined as illustrated in step 523. The child T$^1$ of this root $\delta_{B_1C_1}$ is:

$$C \stackrel{C_1=A_1}{\rightarrow} (A \stackrel{A_1=B_1}{\rightarrow} (\sigma_{B_1=4}(B)))$$

The root of the child $$C \stackrel{C_1=A_1}{\rightarrow} (A \stackrel{A_1=B_1}{\rightarrow} (\sigma_{B_1=4}(B)))$$

is $$\stackrel{C_1=A_1}{\rightarrow}.$$

Therefore, the call in step 523 is suspended and the operation continues at step 515, where the uniqueness properties of binary operations are determined. The uniqueness properties of the binary operation $$\stackrel{C_1=A_1}{\rightarrow}$$

are first determined for one child and then the other child as illustrated by steps 525 and 535.

For the left child of the root $$\stackrel{C_1=A_1}{\rightarrow},$$

the operation continues at step 511 where the uniqueness properties of the left child, C, are determined. Because C is a leaf, procedure 1 (illustrated by column 1, step 561) is followed. In step 561, procedure 1 of the uniqueness process is implemented to determine the uniqueness properties of the relation C. Procedure 1 of the uniqueness process is described in detail below.

Once this is done, the left child of the root $$C_{1 \overset{=}{\to} A_1}$$

is completely processed. Hence, the operation continues back at step 535 where the uniqueness properties of the right child of the root $$C_{1 \overset{=}{\to} A_1}$$

are determined.

The right child of the root $$C_{1 \overset{=}{\to} A_1}$$

is $$(A \overset{A_1 = B_1}{\to} (\sigma_{B_1=4}(B)))$$

The root of this child is $$A_1 \overset{=}{\to} B_1,$$

for which the uniqueness properties are determined by the augmented unique process as illustrated by step 515.

For the left child of the root $$A_1 \overset{=}{\to} B_1,$$

the call is suspended and the operation continues at step 561 where the uniqueness properties of the left child, A, are determined. In step 561, procedure 1 of the uniqueness process is implemented to determine the uniqueness properties of the relation A.

Once this is done, the operation can continue at step 535 where the uniqueness properties of the right child of the root $$A_1 \overset{=}{\to} B_1,$$

are determined. The right child of the root $$A_1 \overset{=}{\to} B_1$$

is $$(\sigma_{B_1=4}(B))$$

The uniqueness properties of the root, $(\sigma_{B_1=4}(B))$, are determined as illustrated by step 512. The child of $\sigma_{B_1=4}$ is B. Because B is a leaf, the uniqueness properties of B are determined by 511 as described above for the leaves C and A.

Once the uniqueness properties of B are determined, the process 'unwinds' to determine the uniqueness properties of the parents and all ancestors in an outward fashion. The uniqueness properties of $(\sigma_{B_1=4}(B))$ are determined in step 562 by applying procedure 2 of the uniqueness process. The uniqueness properties of $$A_1 \overset{=}{\to} B_1$$

are determined in step 565 by applying procedure 5 of the uniqueness process. The uniqueness properties of $\delta_{B_1 C_1}$ are determined in step 563 by applying procedure 3 of the uniqueness process. And finally, the uniqueness properties of $\pi_{C_1}$ are determined in step 564 by applying procedure 4 of the uniqueness process.

The procedure described above is repeated for the second half (the right half in this case) of the expression. That is, the above procedure is repeated for the subexpression $$\pi_{D_1}(D \overset{D_1 = E_1}{\to} E).$$

The root of this expression is $\pi_{D_1}$, which leads us to procedure 4 where steps 514 and 524 dictate that the uniqueness properties of the child $$D_1 \overset{=}{\to} E_1$$

of this root be determined. To determine the uniqueness properties of $$D_1 \overset{=}{\to} E_1,$$

step 515 is used. According to steps 525 and 535, the uniqueness properties of D and E are determined. The uniqueness properties of D and E are determined by step 511 where procedure 1 of uniqueness process is applied individually to both D and E in step 561. After step 561 is completed for both D and E, the operation unwinds as described above. In unwinding, uniqueness process is applied to $$D_1 \overset{=}{\to} E_1$$

in step 565 and then uniqueness process is applied to $\pi_{D_1}$ in step 564.

At this time, to complete the unwinding, the operation continues at column 6 where procedure 6 of uniqueness process is applied to the root of the expression $T_L \cap_a T_R$.

Procedures of the Uniqueness Process

The uniqueness process according to one embodiment of the invention is now described. The procedure of the uniqueness process is described as follows, where:

$\theta_r$ is defined as a variable, indicating a root of expression T.

$\theta_r$ is defined as a variable representing a child of a root.

The uniqueness process has six procedures, one of which is followed depending on the root in question:

Procedure 1

If $\theta_r$ is a leaf (i.e., a base relation s) then

```
{
  inique(T) = keySet(s)
  sBindSet(T) = { }
  wBindSet(T) = { }
  joinAttr(T) = { }
}
```

Procedure 2

If $\theta_r = \sigma_P$ and $\theta_c$ is its child (a base relation s=<R, V, E>) then

```
{
    If ∃ K ∈ unique(s) such that (K - sBind(P,K))
      = { } then
        {       /* ... one-tuple condition */
            unique(T) = {A | A ∈ R}
            sBindSet(T) = {A | A ∈ R}
        }
    else
        {
            unique(T) = min({K - sBind(P,K) | K ∈
              unique(s))
            sBindSet(T) = {A | A ∈ sch(P) ∧ P
              strongly binds A}
        }
    wBindSet(T) = { }
    joinAttr(T) = { }
    for each attribute A that is strongly bound by
      P do
        p Set(A) = {(A, 1)}
}
```

Procedure 3

If $\theta_r = \delta_X$ and $\theta_c$ is its child then

```
{
    X' = X
    if X' ⊇ joinAttr(→_c) then
        for each attribute W ∈ (wBindset(→_c)∩X') do
            if (∃A) ((A, 1) ∈ pSet(W)∧A ∃ X'∧ level(A) >
              level (W)) then
                X' = X' - W
        X' = X - sBindSet(→_c)
        if X' = { } then /* ... one-tuple condition */
            unique(T) = {A | A ∈ X}
        else
            unique(T) = min(unique(→_c) ∪ {X'})
    sBindSet(T) = sBindSet(→_c) ∩ X
    wBindSet(T) = wBindSet(→_c) ∩ X
}
```

Procedure 4

If $\theta_r = \pi_X$ and $\theta_c$ is its child then

```
{
    unique(T) = unique(→_c)
    sBindSet(T) = sBindSet(→_c) ∩ X
    wBindSet(T) = wBindSet(→_c) ∩ X
    joinAttr(T) = joinAttr(→_c)
}
```

Procedure 5

5. If $^P\theta_r^{LR}$ is a binary operator $\in \{\bowtie, \rightarrow, Y, \leftrightarrow\}$, and $\theta_L$ and $\theta_R$ are its left and right children, respectively, then (a) unique(T)=min($S_1 \cup S_2 \cup S_3$),
where:

$S_1$ = unique(→_L) ∘ unique(→_R)

$S_2 = \begin{cases} \text{unique}(\Rightarrow_L) & \text{if} \Rightarrow \in \{\bowtie,\rightarrow\}, P_{LR} \text{ is} \\ & \text{equi-join and } (sch(P_{LR}) \\ & \cap sch(\Rightarrow_R)) \in \text{unique}(\Rightarrow_R) \\ \{\} & \text{otherwise} \end{cases}$ $S_3 = \begin{cases} \text{unique}(\Rightarrow_R) & \text{if} \Rightarrow \in \{\bowtie,\leftarrow\}, P_{LR} \text{ is} \\ & \text{equi-join and } (sch(P_{LR}) \\ & \cap sch(\Rightarrow_L)) \in \text{unique}(\Rightarrow_L) \\ \{\} & \text{otherwise} \end{cases}$ (b) if $\theta_r = \bowtie$ then sBindSet(T)=sBindSet($\theta_L$)∪sBindSet($\theta_R$)

wBindSet(T)=wBindSet($\theta_L$)∪wBindSet($\theta_R$)

if $\theta_r = \rightarrow$ then sBindSet(T)=sBindSet($\theta_L$)

wBindSet(T)=wBindSet($\theta_L$)∪wBindSet($\theta_R$)∪
sBindSet($\theta_R$)

if $\theta_r = \leftarrow$ then sBindSet(T)=sBindSet($\theta_R$)

wBindSet(T)=wBindSet ($\theta_L$)∪wBindSet($\theta_R$)∪
sBindSet($\theta_L$)

if $\theta_r = \leftrightarrow$ then
sBindSet(T)={ } wBindSet(T)=wBindSet($\theta_L$)∪wBindSet($\theta_R$)∪ sBindSet($\theta_L$)

∪sBindSet($\theta_R$)

(c) for each attribute A in a sBindSet(T) and wBindSet(T) compute closure of pSet(A) under predicate $P_{LR}$ as follows:

if $P_{LR}$ contains subclause A=B then if $\theta_r \in \{\bowtie, \leftrightarrow\}$ then add <B, level(A)> to pSet(A)

if $\theta_r = \rightarrow$ and A is from the preserved side of → then add <B, level(A)+1> to pSet(A)

if $\theta_r = \rightarrow$ and A is from the null-supplying side of → then add <B, level(A)+1> to pSet(A)

(d) joinAttr(T)=joinAttr($\theta_L$)∪joinAttr($\theta_R$)∪(all the attributes mentioned in $P_{LR}$)

Procedure 6

If $\theta_r \in \{\cap_d, \cap_a\}$ and $\theta_L$ and $\theta_R$ are its left and right children, respectively, then

```
{
    sBindSet(T) = min(rename_Ω(sBindSet(→_L) ∪
      sBindSet(→_R)))
    wBindSet(T) = { }
    joinAttr(T) = { }
    if →_r is ∩_d then
        unique(T) = min(rename_∩({output attributes of ∩_d}
          ∪ unique(→_L)
          ∪ unique(→_R)))
    else
        unique(T) = min(rename_∩(unique(→_L) ∪unique(→_R)))
}
```

Application of the Uniqueness Process

As described above, in steps 561–566 of the augmented unique process, the appropriate procedure of the uniqueness process is applied to the appropriate root of the expression to determine the uniqueness properties of that root. That is each procedure determines the unique(T)
sBindSet(T)
wBindSet(T)
joinAttr(T)

for each associated root.

The application of the uniqueness process as applied in this manner is now described in greater detail.

In step 561, the uniqueness process is applied to determine the uniqueness properties of $\odot_r$, where $\odot_r$ is a leaf, or a base relation s. The procedure of uniqueness process applied in this step is procedure 1. Procedure 1 of uniqueness process is now described. In procedure 1, the unique set for the input subexpression is set equal to the key set for that expression. The sBindSet, wBindSet, and joinAttr set are all initialized to the empty set. For example, if the key set of the expression B is $B_1,B_2$, the unique set is defined as $B_1,B_2$.

In step 562, uniqueness process is applied to determine the uniqueness properties of $\odot_r$, where $\odot_r$ is a selector operation $\sigma_P$ on the predicate P. The procedure of uniqueness process applied in this step is procedure 2. Note that because the process is applied in a recursive manner (as described above with reference to the augmented unique process), step 562 is not reached until the uniqueness properties of all the children of $\odot_r$ have been determined.

Figure 6:
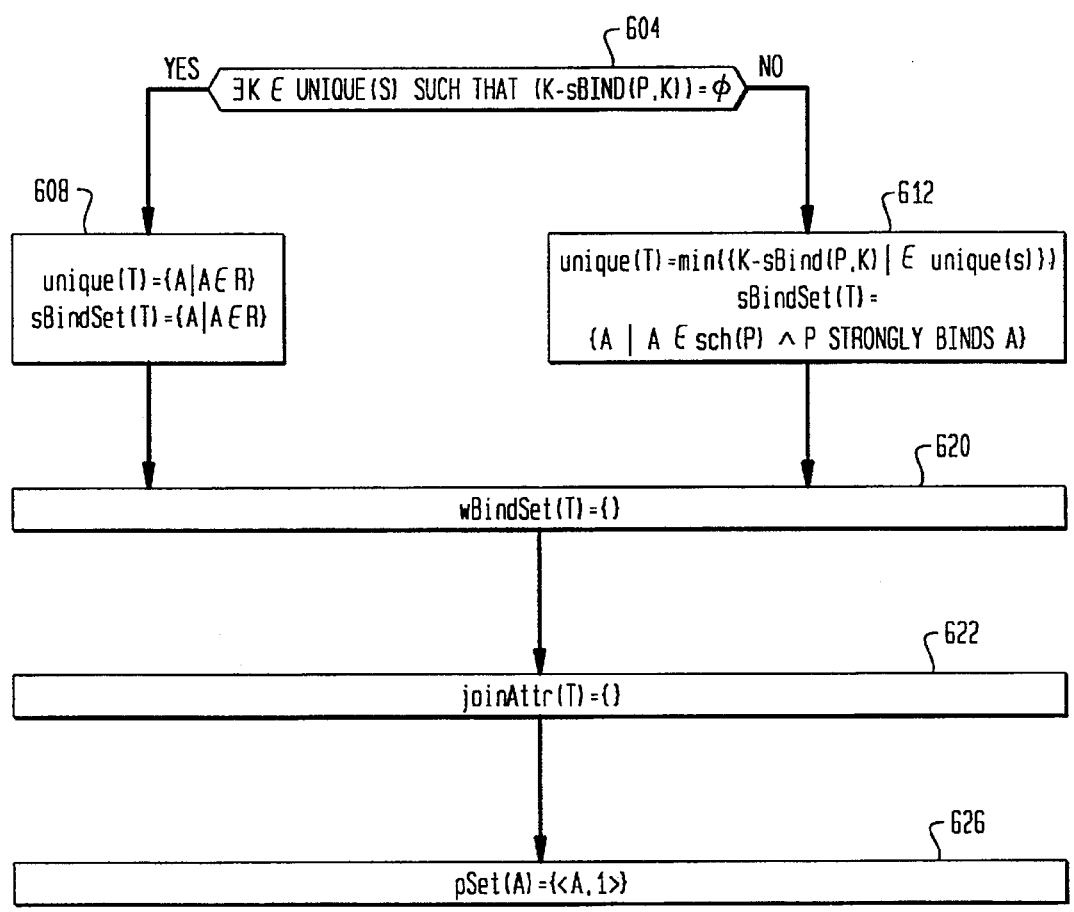
FIG. 6 is an operational flow diagram illustrating an application of procedure two of the uniqueness process according to one embodiment of the invention.

FIG. 6 illustrates procedure 2 of uniqueness process.

In procedure 2, The unique(t) and sBindSet(t) for P are first determined. To make such a determination, it is first determined in a step 604 whether there exists a set of attributes, K, in the unique set of the child of T such that all the attributes in K are strongly bound by predicate P. That is, it is determined whether:

$$\exists K \in \text{unique}(s) \text{ such that } (K-s\text{Bind}(P, K))=\{\}$$

If this is true, a one-tuple condition is present. This means there is exactly one tuple in the relationship computed at this point, therefore, every attribute is sufficient to identify the tuples uniquely (i.e., all attributes are unique).

If a one-tuple condition exists, (i.e. if step 604 is true), in a step 608 all the attributes currently in the node are added to unique (T) for this node:

$$\text{unique}(T)=\{A | A \in R\}$$

The strong bound set is similarly computed as:

$$s\text{BindSet}(T)=\{A | A \in R\}$$

If, on the other hand, step 604 proves false (i.e., if all the attributes are not bound), the unique set is determined in step 612 by including the attributes from K that were not bound. Thus, the unique set is determined as follows:

$$\text{unique}(T)=\min(\{K-s\text{Bind}(P,K) | K \in \text{unique}(s)\})$$

The strongly bound set is defined to include all the attributes from the predicate which are strongly bound at this point as follows:

$$s\text{BindSet}(T)=\{A | A \in sch(P) \land P \text{ strongly binds } A\}$$

In steps 620 and 622 the weakly bound set and joint attribute sets are defined as the empty set.

$$w\text{BindSet}(T)=\{\}$$

$$\text{joinAttr}(T)=\{\}$$

Finally, in a step 626, for each attribute A that is strongly bound by P, level information is added. Specifically, each attribute A is defined as being level one as follows:

$$p\text{Set}(A)=\{<A, 1>\}.$$

To summarize to this point, the uniqueness properties for the leaf node were first determined using procedure one, in step 561. Then, once the uniqueness properties for the leaf node are determined, the uniqueness properties are determined for a selection node, having the leaf node as its child.

In step 563, uniqueness process is applied to determine the uniqueness properties of $\odot_r$, where $\odot_r$ is a delta projection operation $\delta_X$ and X is a the set of attributes for the projection. The procedure of uniqueness process applied in this step is procedure 3. Note that because the process is applied in a recursive manner (as described above with reference to the augmented unique process), step 563 is not reached until the uniqueness properties of all the children of $\odot_r$ have been determined.

Figure 7:
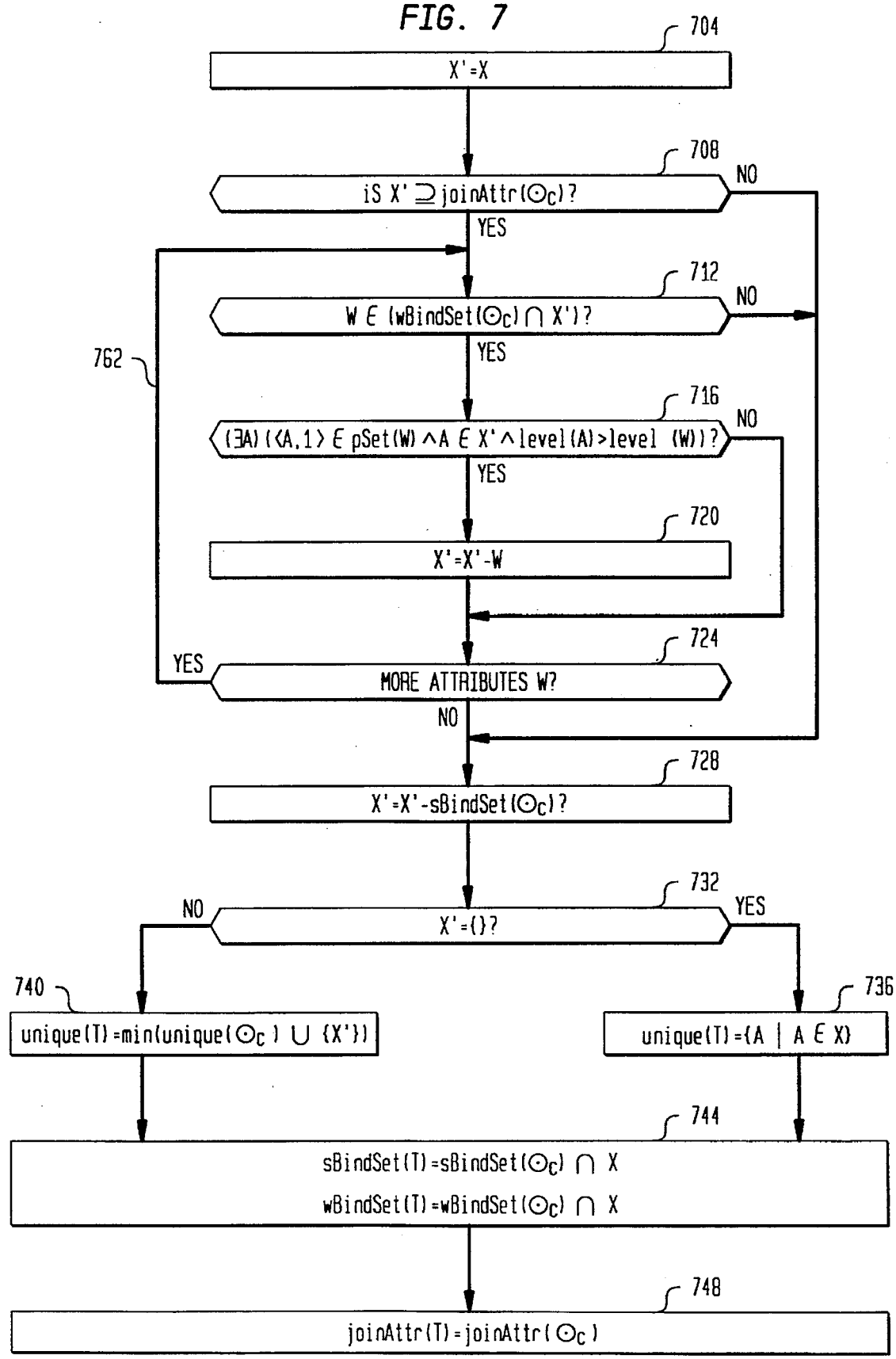
FIG. 7 is an operational flow diagram illustrating an application of procedure three of the uniqueness process according to one embodiment of the invention.

According to step 563, procedure 3 of uniqueness process is utilized to determine the uniqueness properties of $\odot_r$, where $\odot_r$ is a delta projection operation $\delta_X$. FIG. 7 illustrates the application of procedure 3 to $\odot_r$, where $\odot_r$ is a delta projection operation $\delta_X$. In general, the purpose of procedure 3 is determine which attributes can be discarded to obtain smaller sets. In a step 704 the operation begins by assuming that every attribute is going to be retained. In this regard, in step 704 the operation is initialized as:

$$X'=X$$

In a step 708, it is determined whether X' contains the joining attribute set of the child. In other words, in step 708 it is determined whether X' contains all the attributes that are mentioned in join/outer join predicates below this point in the expression tree. This is determined as follows:

$$\text{if } X' \supseteq \text{joinAttr}(\theta_c)$$

If step 708 is true, it is determined in a step 712 for an attribute W whether that attribute W is found in the weakly bound set of the child as well as in the attribute set X', as follows:

$$W \in (w\text{BindSet}(\theta_c) \cap X')$$

If step 712 is true, it is determined in a step 716 whether the level of the attribute W is lower than the level of an attribute that is in X'. This is determined as follows:

$$(\exists A)((A,1) \in p\text{Set}(W) \land A \exists X' \land \text{level}(A) > \text{level}(W))$$

If step 716 is true, in a step 720 the attribute W can be removed from the set of attributes X' as follows:

$$X'=X'-W$$

Steps 712–720 are repeated for all attributes W that are in X' and wBindSet($\theta_c$) to determine which attributes W can be removed from the set of attributes X' as illustrated by decision block 724 and flow line 762. Note that example 4.2 below illustrates the concept of levels for bound attributes.

In a step 728, all the attributes that are strongly bound in the child are also discarded as follows:

$$X'=X'-s\text{BindSet}(\theta_c)$$

In a decision step 732, it is determined whether X' is empty. If X'={ }, then a one-tuple condition exists and in a step 736 every attribute that was in the original X is part of the unique set:

$$\text{unique}(T)=\{A | A \in X\}$$

If, on the other hand, X' is not empty, in a step 740, the unique set is defined as all the attributes in the child combined with all the attributes of X':

$$\text{unique}(T)=\min(\text{unique}(\theta_c) \cup \{X'\})$$

In a step 744, the strongly bound set is defined as the intersection of strongly bound set of the child with the set X.

In other words, the algorithm is only interested in the attributes common to both sets. Similarly, the weakly bound set is defined as the intersection of the weakly bound set of the child with the set X:

$$sBindSet(T)=sBindSet(\Theta_c) \cap X$$

$$wBindSet(T)=wBindSet(\Theta_c) \cap X$$

In a step 748, the join attribute set is defined as the join attribute set of the child:

$$joinAttr(T)=joinAttr(\Theta_c)$$

Figure 8:
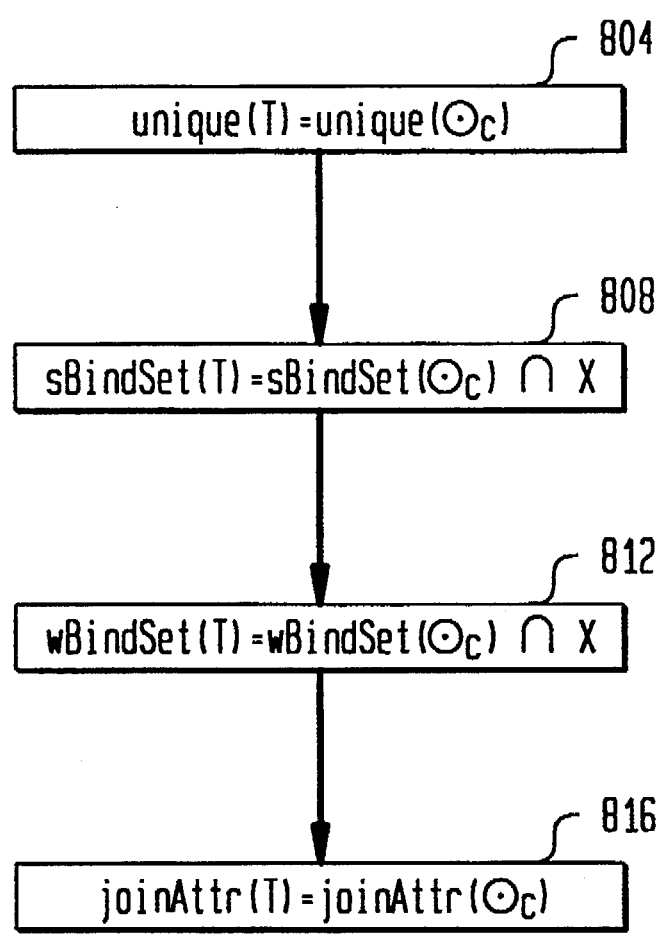
FIG. 8 is an operational flow diagram illustrating an application of procedure four of the uniqueness process according to one embodiment of the invention.

According to step 564, procedure 4 of uniqueness process is utilized to determine the uniqueness properties of $\Theta_r$, where $\Theta_r$ is a non-duplicate removing projection operation $\pi_X$. FIG. 8 illustrates the operation of determining the uniqueness properties of $\Theta_r$, where $\Theta_r$ is a projection operation $\pi_X$. In a step 804, the unique set is defined as the unique set of the child of $\pi_X$.

$$unique(T)=unique(\Theta_c)$$

In a step 808, the strongly bound set is defined as the intersection of strongly bound set of the child with the set X. In other words, the algorithm is only interested in the attributes common to both sets. Similarly, in a step 812 the weakly bound set is defined as the intersection of the weakly bound set of the child with the set X:

$$sBindSet(T)=sBindSet(\Theta_c) \cap X$$

$$wBindSet(T)=wBindSet(\Theta_c) \cap X$$

In a step 816, the join attribute set is defined as the join attribute set of the child:

$$joinAttr(T)=joinAttr(\Theta_c)$$

Figure 9:
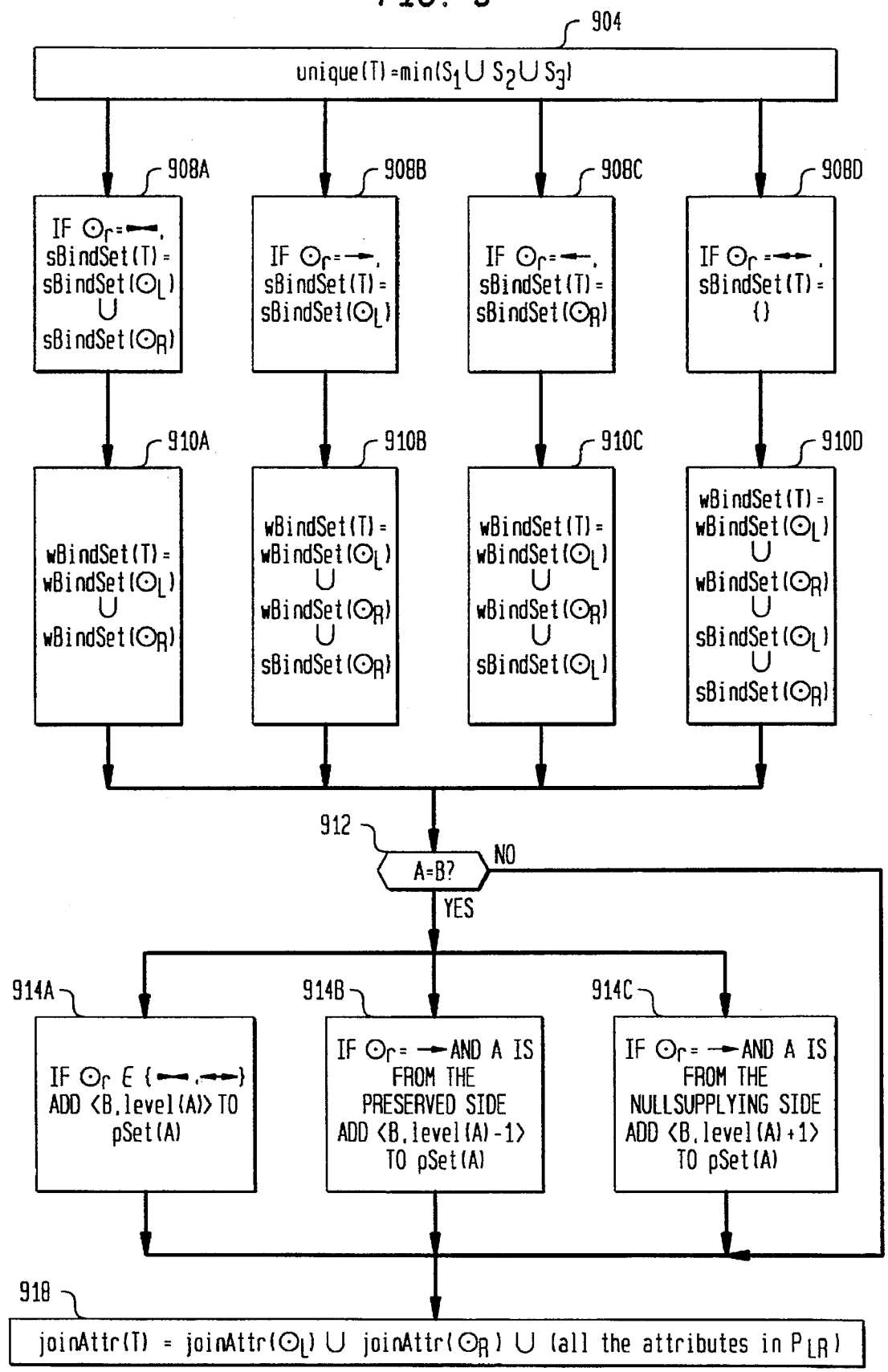
FIG. 9 is an operational flow diagram illustrating an application of procedure five of the uniqueness process according to one embodiment of the invention.

According to step 565, procedure 5 of uniqueness process is utilized to determine the uniqueness properties of $\Theta_r$, where $\Theta_r$ is a binary operator. FIG. 9 illustrates the operation of determining the uniqueness properties of $\Theta_r$ according to one embodiment where $\Theta_r$ is a binary operator $\in \{ \bowtie, \rightarrow, \leftarrow, \leftrightarrow \}$, and $\Theta_L$ and $\Theta_R$ are its left and right children, respectively. Note that by recursively following the augmented unique process, the properties of the left and right children have already been determined.

In a step 904, the uniqueness properties of the operation are defined as the minimum attributes of the union of three sets:

$$unique(T)=min(S_1 \cup S_2 \cup S_3),$$

where min is defined in Section 4.3.

Obviously, to determine the uniqueness properties, the sets ($S_1$, $S_2$, and $S_3$) must be determined.

S1 is determined by concatenating each element in the unique set of the left child with each element in the unique set of the right child:

$$S_1=unique(\Theta_L) \circ unique(\Theta_R)$$

For example, if the left set has A and B and the left set has C and D, the concatenation is AC,AD,BC and BD.

If the operator is a join or left outer join operator, and the predicate $P_{LR}$ is an equi-join (e.g., A1=B1), and if the attributes that are common to both the schema of the predicate and the schema of the right child are in the unique set of the right child, then $S_2$ is the unique set of the left child; otherwise, $S_2$ is the empty set:

$$S_2 = \begin{cases} unique(\Rightarrow_L) & \text{if } \Rightarrow \in \{\bowtie,\rightarrow\}, P_{LR} \text{ is} \\ & \text{equi-join and } (sch(P_{LR}) \\ & \cap sch(\Rightarrow_R)) \in unique(\Rightarrow_R) \\ \{ \} & \text{otherwise} \end{cases}$$

Similarly, if the operator is a join or right outer join operator, and the predicate $P_{LR}$ is an equi-join (e.g., A1=B1), and if the attributes that are common to both the schema of the predicate and the schema of the left child are in the unique set of the left child, then $S_3$ is the unique set of the left child; otherwise, $S_3$ is the empty set:

$$S_3 = \begin{cases} unique(\Rightarrow_R) & \text{if } \Rightarrow \in \{\bowtie,\leftarrow\}, P_{LR} \text{ is} \\ & \text{equi-join and } (sch(P_{LR}) \\ & \cap sch(\Rightarrow_L)) \in unique(\Rightarrow_L) \\ \{ \} & \text{otherwise} \end{cases}$$

In steps 908A–908D and 910A–910D the strongly bound set and weakly bound sets are determined. The actual step followed is chosen based on the actual operator present.

If $\Theta_r=\bowtie$, in a step 908A, the strongly bound set is set equal to the union of the strongly bound set of the left child and the strongly bound set of the right child:

$$sBindSet(T)=sBindSet(\Theta_L) \cup sBindSet(\Theta_R)$$

If $\Theta_r=\bowtie$, in a step 910A, the weakly bound set is set equal to the union of the weakly bound set of the left child and the weakly bound set of the right child.

$$wBindSet(T)=wBindSet(\Theta_L) \cup wBindSet(\Theta_R)$$

If $\Theta_r=\rightarrow$, in a step 908B, the strongly bound set is set equal to the strongly bound set of the left child:

$$sBindSet(T)=sBindSet(\Theta_L)$$

If $\Theta_r=\rightarrow$, in a step 910B, the weakly bound set is set equal to the union of the weakly bound set of the left child and the weakly bound set of the right child and the strongly bound set of the right child.

$$wBindSet(T)=wBindSet(\Theta_L) \cup wBindSet(\Theta_R) \cup sBindSet(\Theta_R)$$

If $\Theta_r=\leftarrow$, in a step 908C, the strongly bound set is set equal to the strongly bound set of the right child:

$$sBindSet(T)=sBindSet(\Theta_R)$$

If $\Theta_r=\leftarrow$, in a step 910C, the weakly bound set is set equal to the union of the weakly bound set of the left child and the weakly bound set of the right child and the strongly bound set of the left child.

$$wBindSet(T)=wBindSet(\Theta_L) \cup wBindSet(\Theta_R) \cup sBindSet(\Theta_L)$$

If $\Theta_r=\leftrightarrow$, in a step 908D the strongly bound set is set to the empty set:

$$sBindSet(T)=\{\}$$

In a step 910D, the weakly bound set is defined as the union of the weakly bound set of the left child, the weakly bound set of the right child, the strongly bound set of the left child and the strongly bound set of the right child:

$$wBindSet(T)=wBindSet(\Theta_L) \cup wBindSet(\Theta_R) \cup sBindSet$$

($\Theta_L$)∪sBindSet( $\Theta_R$)

For each attribute A in sBindSet(t) and wBindSet(t) there is a predicate $P_{LR}$. If the predicate, $P_{LR}$, contains subclause A=B, as illustrated by a step 912, the operation continues at one of steps 914A, 914B or 914C. If not, the operation continues directly to step 918.

The pSet of the binary operator is determined in a step 914 by using the level information. For each attribute A in a sBindSet(T) and wBindSet(T) the closure of pSet(A) under predicate $P_{LR}$ is computed depending on the binary operator and on the relationship between the children.

If the predicate, $P_{LR}$, contains subclause A=B and if $\Theta_r \in \{\bowtie, \leftarrow\}$, in a step 914A, the level of B is the same as the level of A:

add <B, level(A)> to pSet(A)

If the predicate, $P_{LR}$, contains subclause A=B and if $\Theta_r = \rightarrow$ and A is from the preserved side of →, in a step 914B the level of B is one less than the level of A:

add <B, level(A)−1> to pSet(A)

If the predicate, $P_{LR}$, contains subclause A=B and if $\Theta_r = \rightarrow$ and A is from the null-supplying side of → then in a step 914C the level of B is one higher than the level of A:

add <B, level(A)+1> to pSet(A)

In a step 918, the join attributes are defined as the join attributes from the left side plus the join attributes from the right side plus all the attributes from the predicate, $P_{LR}$.

joinAttr(T)=joinAttr( $\Theta_L$)∪joinAttr( $\Theta_R$)∪(all the attributes in $P_{LR}$)

Figure 10:
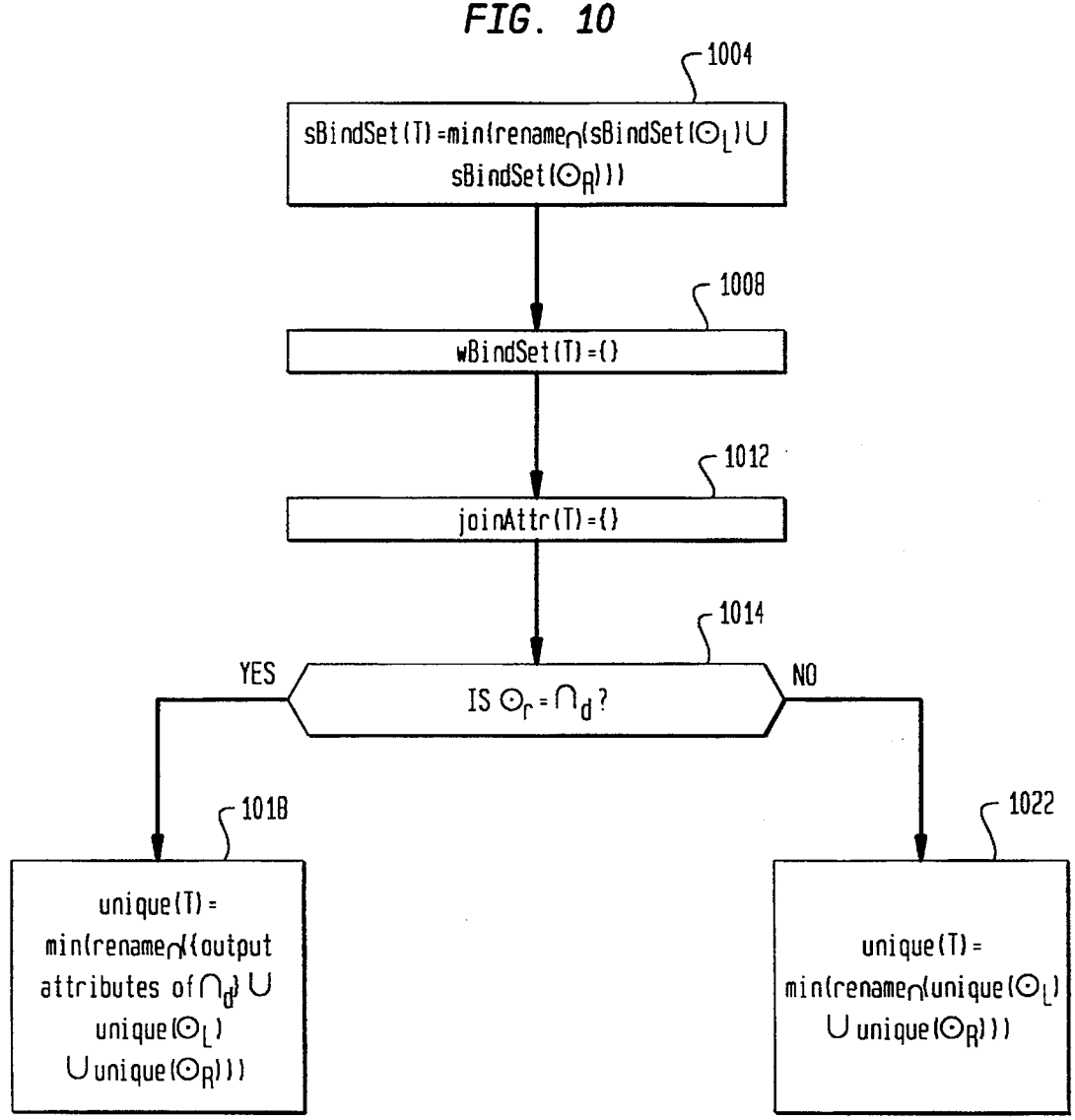
FIG. 10 is an operational flow diagram illustrating an application of procedure six of the uniqueness process according to one embodiment of the invention.

According to step 566, procedure 6 of uniqueness process is utilized to determine the uniqueness properties of $\odot_r$, where $\odot_r$ is a binary intersect operator ∈ {∩$_d$, ∩$_a$}. FIG. 10 illustrates the operation of determining the uniqueness properties of $\odot_r$ according to one embodiment, where $\odot_r$ is a binary operator ∈ {∩$_d$, ∩$_a$}, and $\Theta_L$ and $\Theta_R$ are its left and right children, respectively. Note that by recursively following the augmented unique process, the properties of the left and right children have already been determined.

In a step 1004, the strongly bound set is defined as the minimum of the renamed combination of strong bind set of the left child and the strong bind set of the right children:

sBindSet(T)=min (rename$_\cap$(sBindSet( $\Theta_L$)∪sBindSet( $\Theta_R$)))

In a step 1008, the weak bind set is the empty set:

wBindSet(T)={}

In a step 1012, the join attribute set is the empty set:

joinAttr(T)={}

In a step 1014 it is determined whether the intersect operation is an intersect distinct operator (i.e., if $\Theta_r$ is ∩$_d$), then in a step 1018 the unique set is defined as the minimum of the renamed set of the combination of the output attributes of the intersect distinct and the unique set of the left child and the unique set of the right child:

unique(T)=min(rename$_\cap$({output attributes of ∩$_d$}∪unique ( $\Theta_L$)∪unique( $\Theta_R$)))

If in step 1014 it is determined that the operator is not intersect distinct, then in step 1022 the unique set is defined as the minimum of the renamed set of the combination of the unique set of the left child and the unique set of the right child:

unique(T)=min(rename$_\cap$(unique( $\Theta_L$)∪unique( $\Theta_R$)))

In an implementation, the size of the generated sets can be reduced at each step of the recursion by pruning the attributes by the relevant set of attributes, which would be passed down the recursion chain. Thus, projection operators such as $\delta_X$ and $\pi_X$ would pass down X as the set of relevant attributes and all generated sets could be restricted to these attributes.

Although uniqueness process does not require it, its efficacy can be greatly improved by doing some pre-processing of the input expression tree along the lines of some existing, well-known, techniques such as σ-pushdown which moves all the σ operations next to the base relations (Galindo-Legaria, C., and Rosenthal, A., "How to extend a conventional optimizer to handle one- and two-sided outerjoin," *Proceedings IEEE Data Engineering Conference*, pp. 402–409, 1992).

4.5 Examples on uniqueness propagation

Example of Procedure 3 of the Uniqueness Process

As stated above with respect to procedure 3, when attempting to discard an attribute, the higher level is checked first. In this example, let A, B, C be relations, having real attributes $A_1A_2$, $B_1$, $C_1$, respectively. Consider the expression $$e = \delta_{A_1B_1}(C \stackrel{C_1=A_1}{\rightarrow} (\sigma_{A_1=5}(A) \stackrel{A_1=B_1}{\rightarrow} \sigma_{B_1=5}(B))). \text{Let}$$

$\sigma_{A_1=5}(A) =$

| $A_1$ | $A_2$ |
|---|---|
| 5 | 6 |
| 5 | 7 |
| 5 | 8 |

$\sigma_{B_1=5}(B) =$

| $B_1$ |
|---|
| — |

$C =$

| $C_1$ |
|---|
| 5 |
| 6 |
| 7 |

Then, $e =$

| $A_1$ | $B_1$ |
|---|---|
| 5 | — |
| — | — |

We know that $A_1B_1$ is a key of the expression. The question is whether we can discard $B_1$ and say that $A_1$ is also a key.

As this example demonstrates, $B_1$ can be removed from the key $A_1B_1$ of e and $A_1$ is also a key. However, $A_1$ cannot be removed from $A_1B_1$ because $B_1$ is not a key. This illustrates the concept of "levels" for bound attributes.

Example illustrating the importance of carrying join attributes in procedure 3

Let A, B be relations, having real join attributes $A_1A_2$, $B_1B_2$ respectively. Here, X' is $A_1B_1$. According to procedure 3, because the join attributes are not contained in X', this step cannot be applied. Consider the expression.

$$e = \delta_{A_1B_1}(\sigma_{\{A_1=5\}}(A)^{A1=B1} \stackrel{\wedge}{\to}^{A2=B2} \sigma_{B_1=5}(B)). \text{ Let}$$

$\sigma_{A_1=5}(A)$

| $A_1$ | $A_2$ |
|---|---|
| 5 | 6 |
| 5 | 7 |

$\sigma_{B_1=5}(B) =$

| $B_1$ | $B_2$ |
|---|---|
| 5 | 6 |

Then, e =

| $A_1$ | $B_1$ |
|---|---|
| 5 | 5 |
| 5 | — |

As this example demonstrates, we cannot remove $B_1$ from the key $A_1B_1$ of e and claim that $A_1$ is also a key, even though $B_1$ is at a lower "level than $A_1$. This illustrates the requirement that all join attributes be present in the projection list for $\delta$ before printing considerations be applied.

Example illustrating weak binding and uniqueness propagation

This example illustrates the use of weak bindings and uniqueness propagation for converting $\cap_a$ to $\cap_d$ and subtree pruning. This application of uniqueness propagation utilizes the following identities:

1. (Chen, A. L. P., "Outerjoin optimization in multidatabase systems," 2nd International Symposium on Databases in Parallel and Distributed Systems, 1990) $\delta_X(r \to s) = \delta_X(r)$, where $X \subseteq sch(r)$; and 2. (Paulley, G. N. and Larson, P-A., "Exploiting uniqueness in query optimization," CASCON, pp. 804–822, Vol. II, October 1993) $\delta_X(r) \cap_a s = \delta_X(r) \cap_d s$, where $X \subseteq sch(r)$.

Consider the query expression involving relations A, B, C, D, E where $A_1 \in sch(A)$, $B_1 \in sch(B)$, $C_1 \in sch(C)$, and $D_1 \in sch(D)$:

$$\pi_{C_1}(\delta_{B_1C_1}(C \stackrel{C1=A1}{\to} (A \stackrel{A1=B1}{\to} (\sigma_{B_1=4}(B)))))$$
$$\cap_a$$
$$\pi_{D_1}(D \stackrel{D1=E1}{\to} E).$$

This expression is equivalent to:

$$\pi_{C_1}(\delta_{B_1C_1}(C \stackrel{C1=A1}{\to} (A \stackrel{A1=B1}{\to} (\sigma_{B_1=4}(B)))))$$
$$\cap_d$$
$$\pi_{D_1}(D).$$

Because of weak binding and uniqueness propagation we can determine that $C_1$ is indeed a key for $$\pi_{C_1}(\delta_{B_1C_1}(C \stackrel{C1=A1}{\to} (A \stackrel{A1=B1}{\to} (\sigma_{B_1=4}(B))))).$$

That allows us to realize that $\pi_{C_1}$, which converts $\cap_a$ to $\cap_d$, which in turn allows $\pi_{D_1}$ to be the same as $\delta_{D_1}$, which in turn prunes the expression D $$D \stackrel{D1=E1}{\to} E$$

E down to just D.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

While the invention has been particularly shown and described with reference to (a) preferred embodiment(s) thereof, it will be understood by those skilled in the art that (various changes) (the foregoing and other changes) in form and details may be made therein without departing from the spirit and scope of the invention.

Having thus described our invention, what we claim as new and desire to secure by Letters Patent is:

1. A method of determining uniqueness properties of an expression for query optimization, comprising the steps of:
   a) determining a root of the expression, wherein said root is one of a base relation, a unary operation or a binary operation;
   b) calling a first one of a plurality of procedures of an augmented unique process to determine uniqueness properties of a child of the root, wherein the procedure called is chosen based on said determined root;
   c) where said root is a base relation, applying a first procedure of a uniqueness process to determine the uniqueness properties of said base relation;
   d) where said root is a unary or binary operation,
      i suspending the called procedure,
      ii calling a second one of a plurality of procedures of said augmented unique process to determine the uniqueness properties of the child of said unary or binary operation,
      iii repeating said steps i and ii until a base relation is reached, and
      iv applying a first procedure of a uniqueness process to determine the uniqueness properties of said reached base relation; and
   e) applying a second of a plurality of procedures of a uniqueness process to determine the uniqueness properties of a parent operator of said base relation, wherein said procedure applied is chosen based on a type of operation represented by said parent; and
   f) repeating said step (e) for each ancestor of a base relation.

2. The method of claim 1, wherein said first procedure of said uniqueness process comprises the steps of:
   setting a unique set for said base relation equal to a key set for said base relation; and
   defining a strongly bound set, a weakly bound set and a join attribute set as empty sets for the expression.

3. The method of claim 1, wherein if said root is a selector operation, said second of a plurality of procedures of said uniqueness process comprises the steps of:

determining whether there exists a set of attributes, K, in a unique set of a child of the expression such that all attributes in K are strongly bound by a predicate to determine whether a one-tuple condition exists;

if said one-tuple condition exists, adding all attributes currently in a node to a unique set of said node and to a strongly bound set of said node;

if said one-tuple condition does not exist, adding attributes in K that are not strongly bound to said unique set and to said strongly bound set of said node;

defining a weakly bound set and a join attribute set as empty sets for said node; and defining each attribute that is strongly bound as being a level one attribute.

4. The method of claim 1, wherein if said root is a delta projection operation, said second of a plurality of procedures of said uniqueness process comprises the steps of:

(a) defining an attribute set as including all attributes for the projection;

(b) determining whether said attribute set contains a joining attribute set of a child of the projection;

(c) if said attribute set contains a joining attribute set of the child, then for each attribute in said attribute set that is found in a weakly bound set of its child as well as in said attribute set, determining whether a level of said attribute is lower than the level of another attribute in said attribute set; and (d) if said level of said attribute is lower than the level of another attribute in said attribute set, removing said first attribute from said attribute set.

5. The method of claim 4, wherein said second of a plurality of procedures of said uniqueness process further comprises the step of removing from said attribute set all of said attributes that are strongly bound in the child.

6. The method of claim 5, wherein said second of a plurality of procedures of said uniqueness process further comprises the steps of:

determining whether there are any attributes remaining in said attribute set;

if no attributes remain in said attribute set, a unique set is defined as all of said attributes originally in said defined attribute set; and if one or more of said attributes remain in said attribute set, said unique set is defined as all of the attributes in the child combined with all of said attributes remaining in said attribute set.

7. The method of claim 6, wherein said second of a plurality of procedures of said uniqueness process further comprises the steps of:

defining a strongly bound set as the intersection of a strongly bound set of the child with a set comprising all of said attributes originally in said defined attribute set; and defining a weakly bound set as the intersection of a weakly bound set of the child with a set comprising all of said attributes originally in said defined attribute set.

8. The method of claim 1, wherein if said root is a non-duplicate removing projection operation, said second of a plurality of procedures of said uniqueness process comprises the steps of:

defining a unique set as a unique set of a child of the root;

defining a strongly bound set as the intersection of a strongly bound set of the child with a set of all attributes of said root;

defining a weakly bound set as the intersection of a weakly bound set of the child with a set of all attributes of said root; and defining a join attribute set as a join attribute set of the child.

9. The method of claim 1, wherein if said root is a binary operator having a left child and a right child, said second of a plurality of procedures of said uniqueness process comprises the steps of:

concentrating each element in a unique set of a left child with each element in a unique set of the right child to create a first set;

if the operator is a join or left outer join operator, and a predicate $P_{LR}$ is an equi-join, and if the attributes that are common to both a schema of the predicate and a schema of the right child are in a unique set of the right child, then a second set is defined as a unique set of the left child, otherwise, said second set is defined as an empty set;

if the operator is a join or right outer join operator, and the predicate $P_{LR}$ is an equi-join, and if the attributes that are common to both the schema of the predicate and the schema of the left child are in the unique set of the left child, then a third set is defined as a unique set of the left child, otherwise said third set is defined as the empty set; and defining uniqueness properties of the operator as minimum attributes of said first, second and third sets.

10. The method of claim 9, wherein if said root is a join operation, said second of a plurality of procedures of said uniqueness process further comprises the steps of:

defining a strongly bound set of said attributes as the union of a strongly bound set of the left child and the strongly bound set of the right child; and defining a weakly bound set of said attributes as the union of a weakly bound set of the left child and the weakly bound set of the right child;

wherein if said root is a left-outer join operation, said second of a plurality of procedures of said uniqueness process further comprises the steps of:

defining a strongly bound set of said attributes as a strongly bound set of the left child; and defining a weakly bound set of said attributes as the union of a weakly bound set of the left child and the weakly bound set of the right child and the strongly bound set of the right child;

wherein if said root is a right-outer join operation, said second of a plurality of procedures of said uniqueness process further comprises the steps of:

defining a strongly bound set of said attributes as the strongly bound set of the right child; and defining a weakly bound set of said attributes as the union of a weakly bound set of the left child and the weakly bound set of the right child and the strongly bound set of the left child; and wherein if said root is a full-outer join operation, said second of a plurality of procedures of said uniqueness process further comprises the steps of:

defining a strongly bound set of said attributes as an empty set; and defining a weakly bound set of said attributes as the union of a weakly bound set of the left child and the weakly bound set of the right child and the strongly bound set of the left child and the strongly bound set of the right child.

11. The method of claim 10, further comprises the steps of:

for each attribute in said strongly bound set and said weakly bound set, determining a closure of a predictor set under the predicate, wherein if the predicate contains subclause A=B, one of the following steps is performed
  (1) if said root is a join operation or a full-outer join operation, the attribute level of B is the same as the level of A,
  (2) if said root is a left-outer join, the attribute level of B is one lower than the attribute level of A, and
  (3) if said root is a right-outer join, the attribute level of B is one higher than the attribute level of A.

12. The method of claim 9, wherein if said root is a binary intersect operator, said second of a plurality of procedures of said uniqueness process further comprises the steps of:

defining a strongly bound set as a minimum of a renamed combination of a strongly bound set of the left child and a strongly bound set of the right child;

defining a weakly bound set and a join attribute set as the empty set;

if the intersect operator is an intersect distinct operator, defining a unique set as the minimum of the renamed set of the combination of the output attributes of the intersect distinct and the unique set of the left child and the unique set of the right child; and if the intersect operator is not an intersect distinct operator, defining the unique set as the minimum of the renamed set of the combination of the unique set of the left child and the unique set of the right child.

13. The method of claim 9, wherein said second of a plurality of procedures of said uniqueness process comprises the steps of:

defining a join attribute set as the union of the attribute set of the left child and the attribute set of the right child and the attributed mentioned in the predicate.

14. The method of claim 1, further comprising the step of using said uniqueness properties to optimize an SQL query.

* * * * *